(12) United States Patent
Bjorstrom et al.

(10) Patent No.: US 7,724,476 B1
(45) Date of Patent: May 25, 2010

(54) COINED HEADLIFT WITH FORMED RAIL OFFSET FOR A DISK DRIVE HEAD SUSPENSION COMPONENT

(75) Inventors: Jacob D. Bjorstrom, Hutchinson, MN (US); Rick R. Drape, Hutchinson, MN (US); Shane T. Dusoski, Howard Lake, MN (US); Justin M. Eggert, Dassel, MN (US); Corey S. Hartmann, Litchfield, MN (US); Shawn P. Henze, Delano, MN (US); Duane A. Lundin, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 733 days.

(21) Appl. No.: 11/226,925

(22) Filed: Sep. 14, 2005

Related U.S. Application Data

(60) Provisional application No. 60/610,426, filed on Sep. 16, 2004, provisional application No. 60/633,873, filed on Dec. 6, 2004, provisional application No. 60/656,768, filed on Feb. 25, 2005, provisional application No. 60/678,280, filed on May 6, 2005.

(51) Int. Cl.
  *G11B 5/54* (2006.01)
(52) U.S. Cl. .................. 360/244.2; 360/255; 360/245
(58) Field of Classification Search ... 360/244.2–245.3, 360/245.5, 254.3–254.4, 254.6, 254.7–254.8, 360/255
  See application file for complete search history.

(56) References Cited

U.S. PATENT DOCUMENTS

| | | | | |
|---|---|---|---|---|
| 5,187,625 A | * | 2/1993 | Blaeser et al. | 360/244.3 |
| 5,299,081 A | * | 3/1994 | Hatch et al. | 360/244.2 |
| 5,379,171 A | * | 1/1995 | Morehouse et al. | 360/255 |
| 5,526,206 A | * | 6/1996 | Shimizu | 360/254.8 |
| 5,537,274 A | * | 7/1996 | Imasaki | 360/245.3 |
| 5,864,448 A | * | 1/1999 | Berberich | 360/254.8 |
| 5,870,252 A | * | 2/1999 | Hanrahan | 360/244.8 |
| 6,151,197 A | * | 11/2000 | Larson et al. | 360/255 |
| 6,181,529 B1 | | 1/2001 | Aoyagi et al. | |
| 6,313,970 B1 | * | 11/2001 | Pace et al. | 360/244.8 |
| 6,407,889 B1 | * | 6/2002 | Khan et al. | 360/255 |
| 6,421,206 B1 | * | 7/2002 | Khan | 360/244.9 |
| 6,483,670 B1 | * | 11/2002 | Watanabe | 360/245.7 |
| 6,611,402 B1 | * | 8/2003 | Mangold | 360/255 |
| 6,617,542 B2 | | 9/2003 | Hayen et al. | |
| 7,085,104 B1 | * | 8/2006 | Hadian et al. | 360/245.7 |
| RE40,203 E | * | 4/2008 | Hatch et al. | 360/245 |

(Continued)

FOREIGN PATENT DOCUMENTS

JP  01107384  4/1989

(Continued)

*Primary Examiner*—Brian E Miller
(74) *Attorney, Agent, or Firm*—Faegre & Benson, LLP

(57) ABSTRACT

A disk drive head suspension headlift formed from a single piece of stainless steel includes a beam region, lift tab and offset region between the beam region and lift tab. The beam region has a major surface and formed side rails. The lift tab is a coined, trough-shaped member at a z-height spaced from the major surface of the beam region. The offset region has a major surface and side rails that transition in height between the side rails of the beam region and the lift tab.

18 Claims, 31 Drawing Sheets

U.S. PATENT DOCUMENTS

| | | | |
|---|---|---|---|
| 7,365,945 B2 * | 4/2008 | Fujimoto et al. | 360/255 |
| 7,489,476 B1 * | 2/2009 | Bjorstrom et al. | 360/245 |
| 7,609,483 B2 * | 10/2009 | Deguchi et al. | 360/254.7 |
| 2004/0027725 A1 * | 2/2004 | Pan et al. | 360/245.3 |
| 2005/0030671 A1 | 2/2005 | Lee et al. | |
| 2005/0036239 A1 * | 2/2005 | Weber | 360/245.5 |
| 2005/0174694 A1 * | 8/2005 | Erpelding | 360/244.8 |
| 2005/0237670 A1 * | 10/2005 | Fujimoto et al. | 360/244.2 |
| 2006/0139811 A1 * | 6/2006 | Yi et al. | 360/245 |
| 2007/0019331 A1 * | 1/2007 | Kido et al. | 360/244.3 |

FOREIGN PATENT DOCUMENTS

| | | |
|---|---|---|
| JP | 2005011511 | 1/2005 |
| JP | 2005166203 A * | 6/2005 |

\* cited by examiner

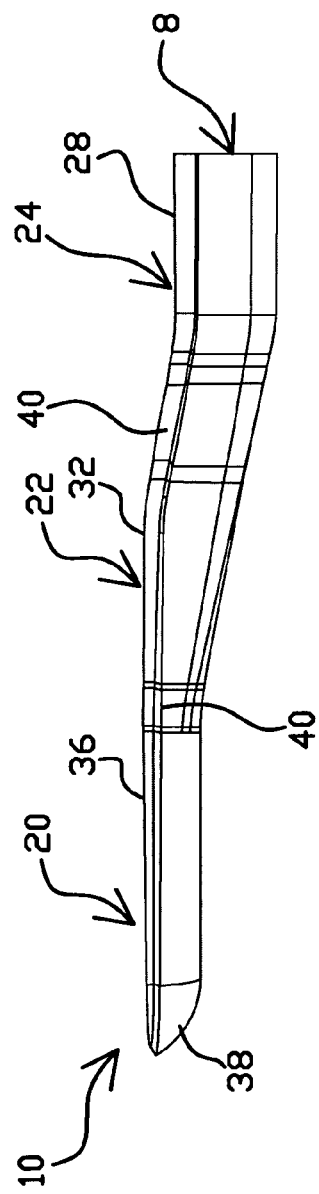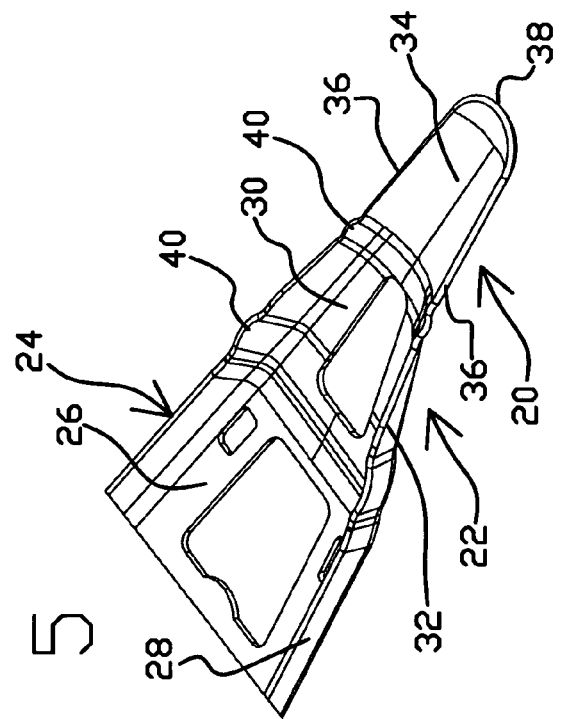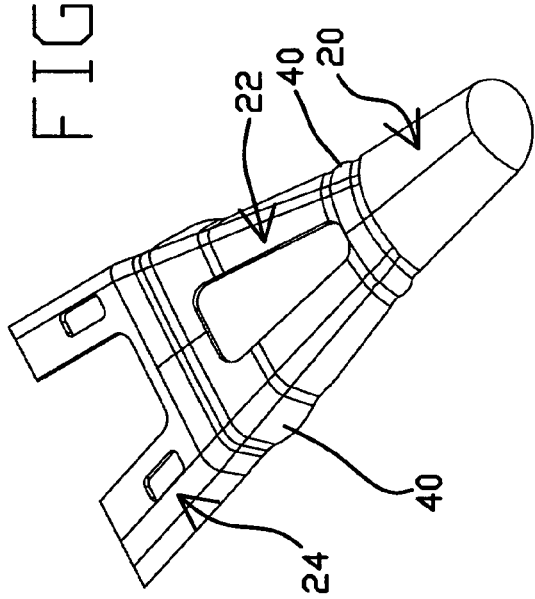

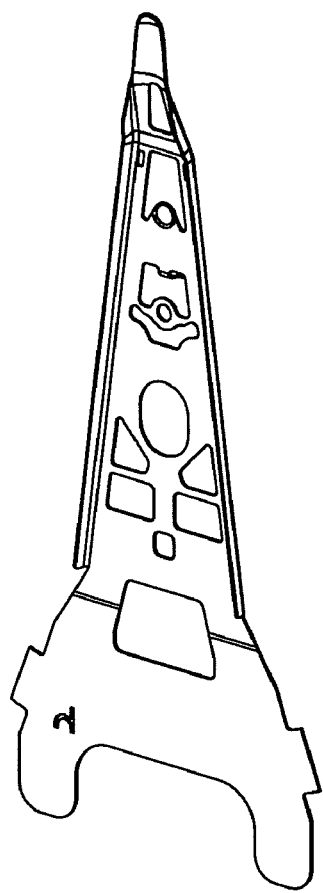
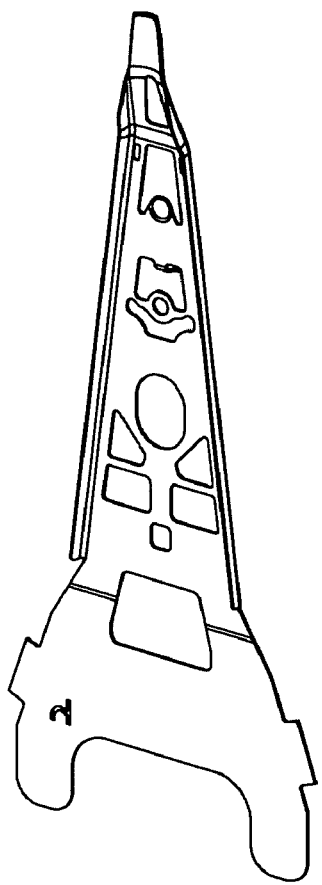
FIGURE 8A₁
FIGURE 8A₂
FIGURE 8B₂

FIGURE 8B₃  FIGURE 8B₄
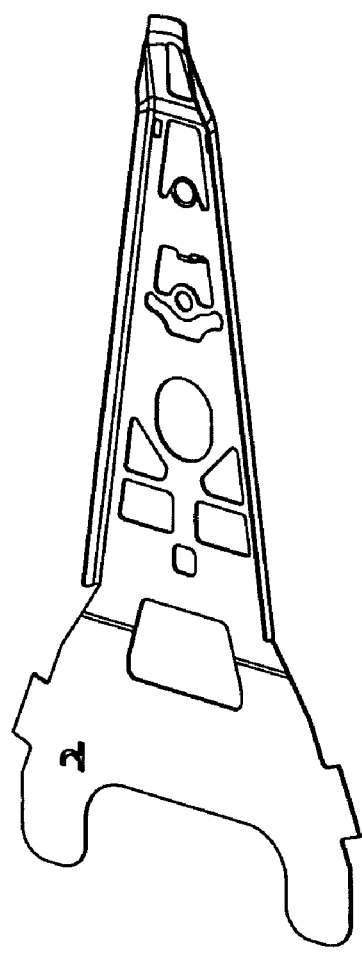
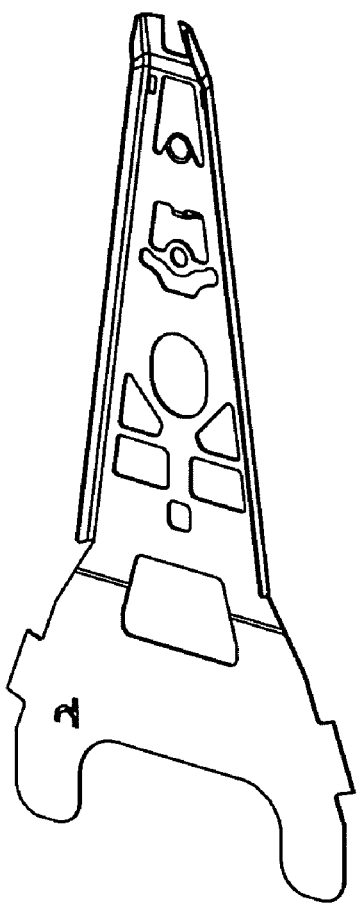
FIGURE 8A₃  FIGURE 8A₄

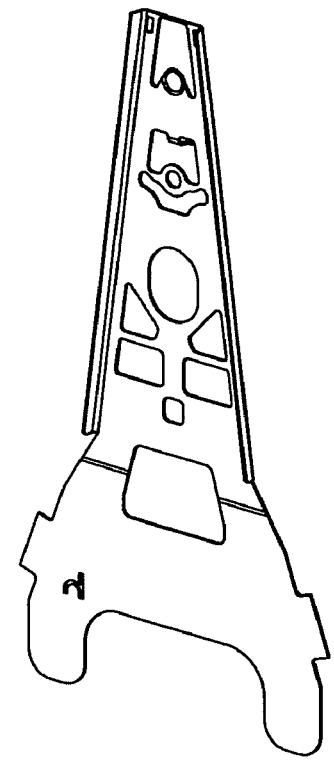
FIGURE 8A₅
FIGURE 8B₅
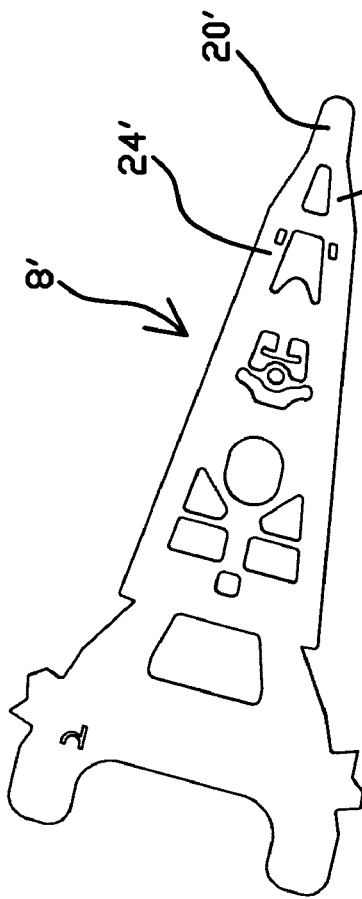
FIGURE 9

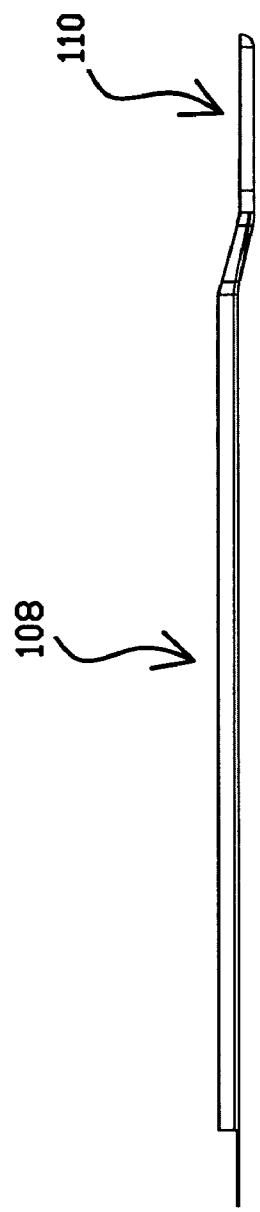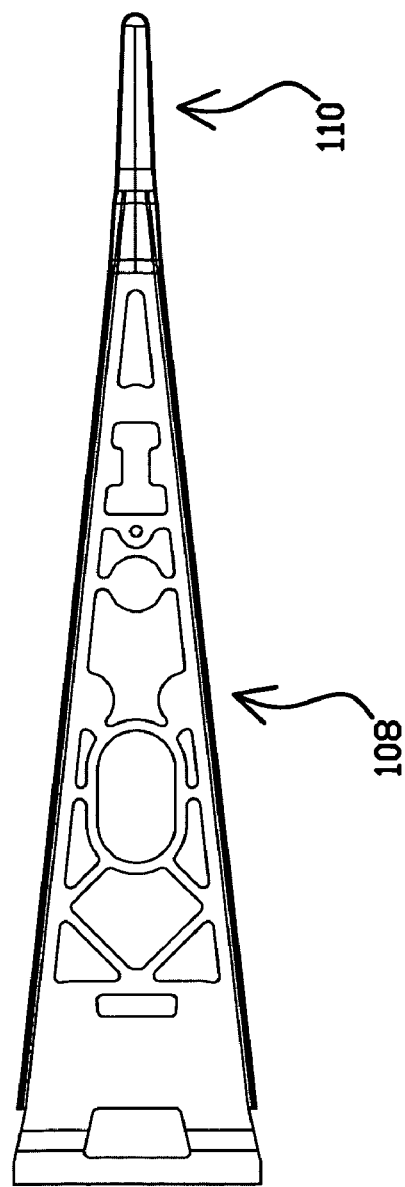

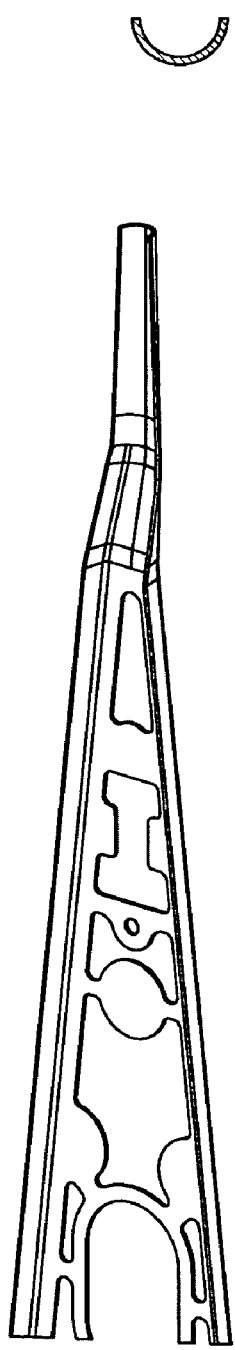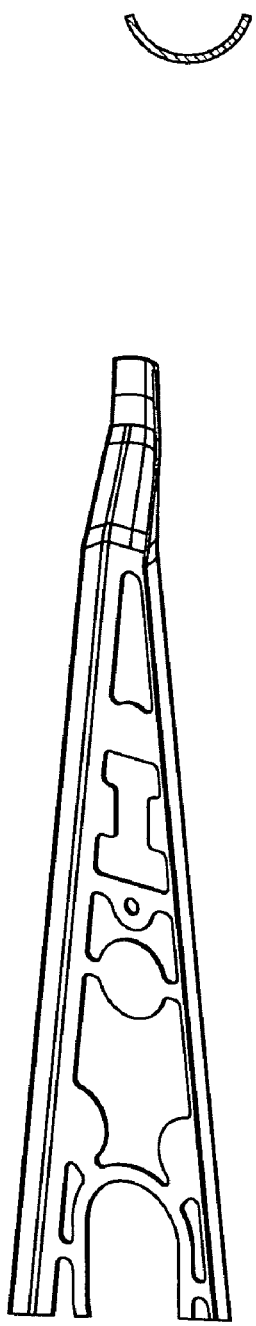
FIGURE 21A₁  FIGURE 21B₁  FIGURE 21A₂  FIGURE 21B₂

FIGURE 21B₃
FIGURE 21B₄
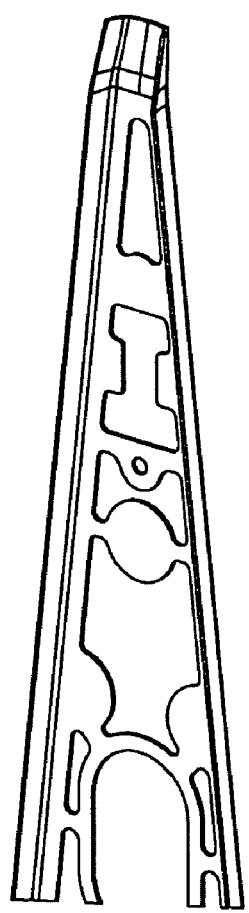
FIGURE 21A₃
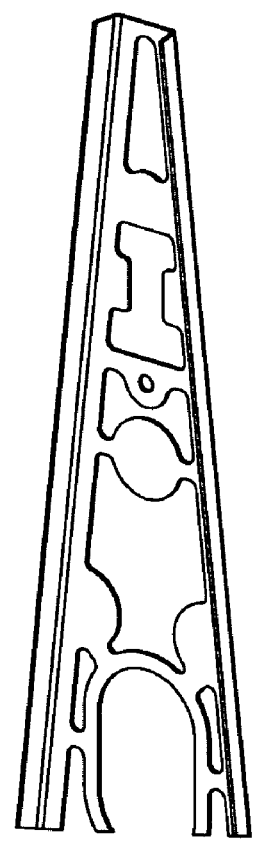
FIGURE 21A₄

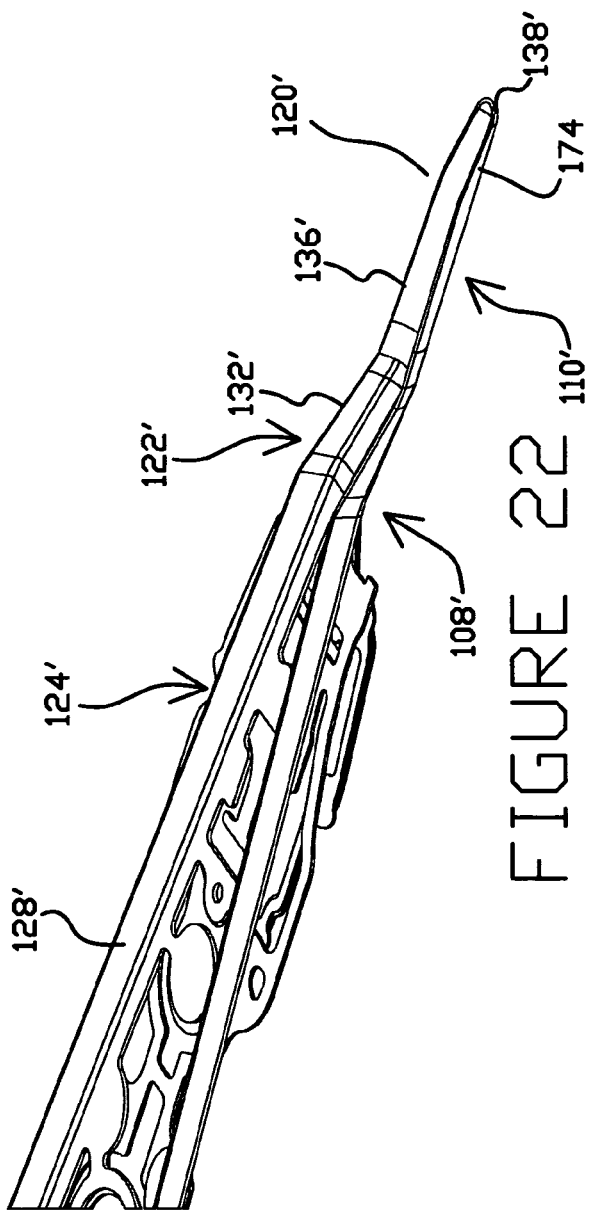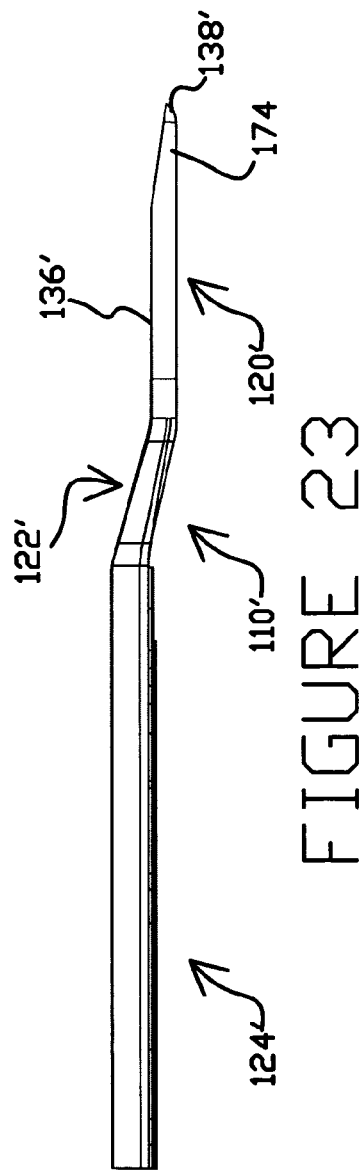

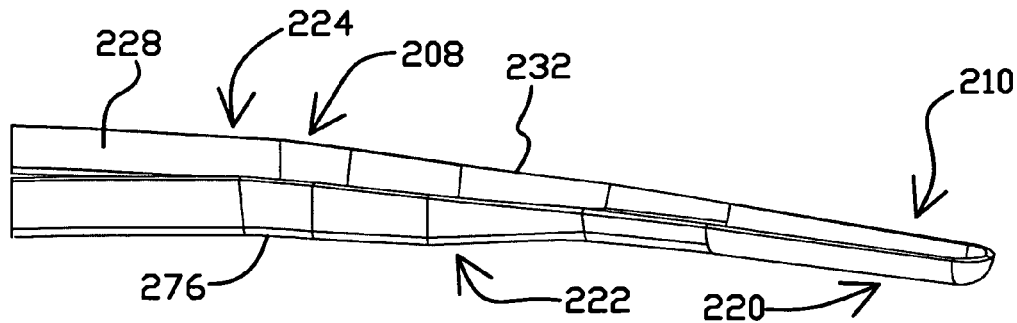
FIGURE 28
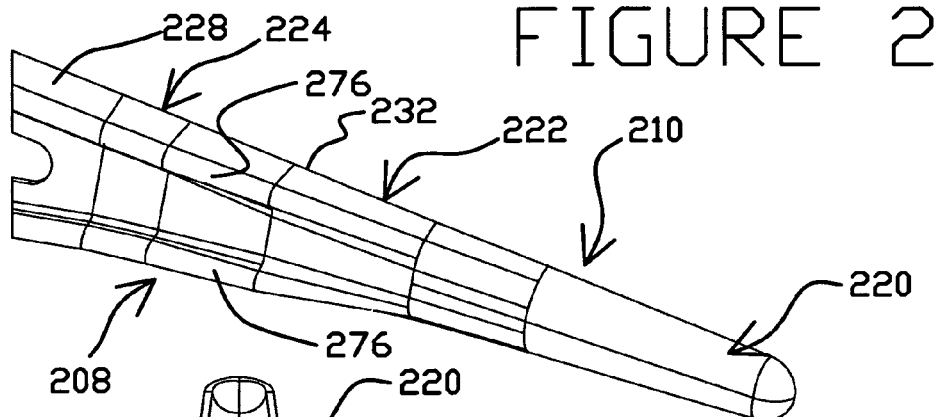
FIGURE 27
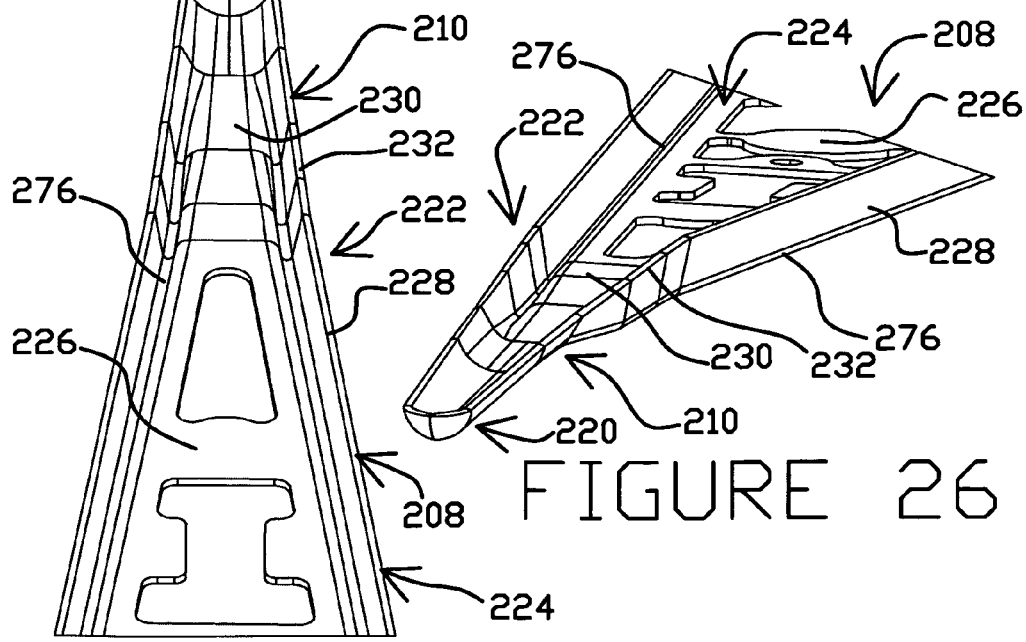
FIGURE 26
FIGURE 25

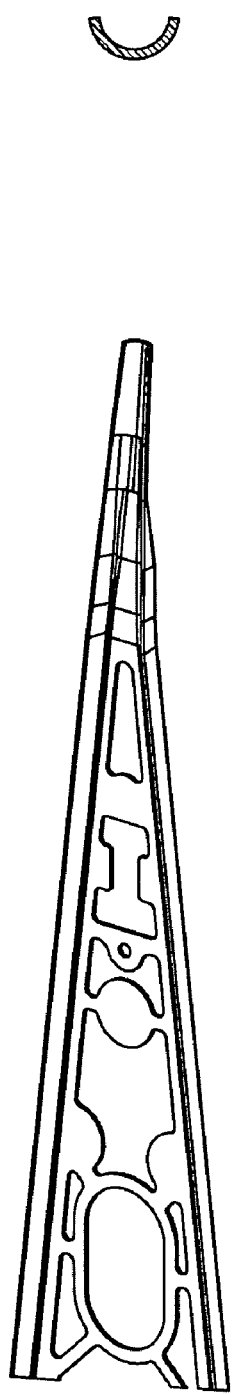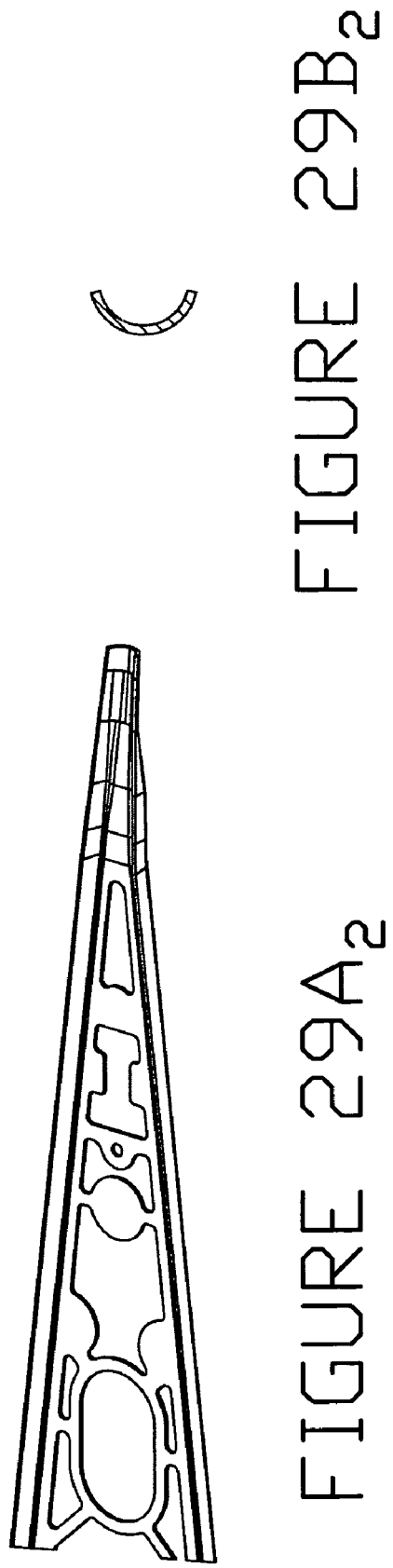
FIGURE 29A₁  FIGURE 29B₁
FIGURE 29A₂  FIGURE 29B₂

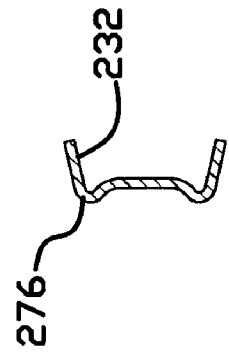
FIGURE 29B₃
FIGURE 29B₄
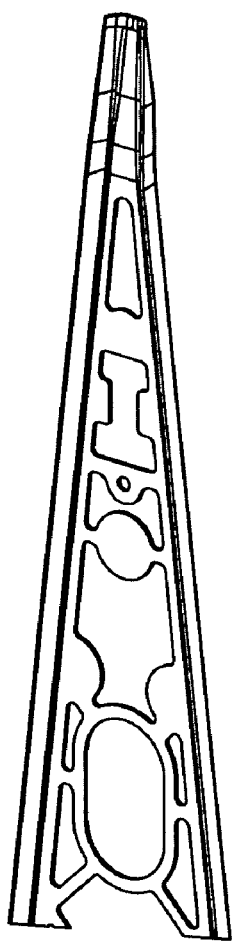
FIGURE 29A₃
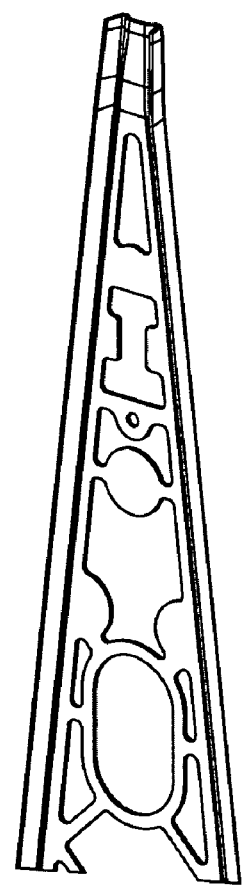
FIGURE 29A₄

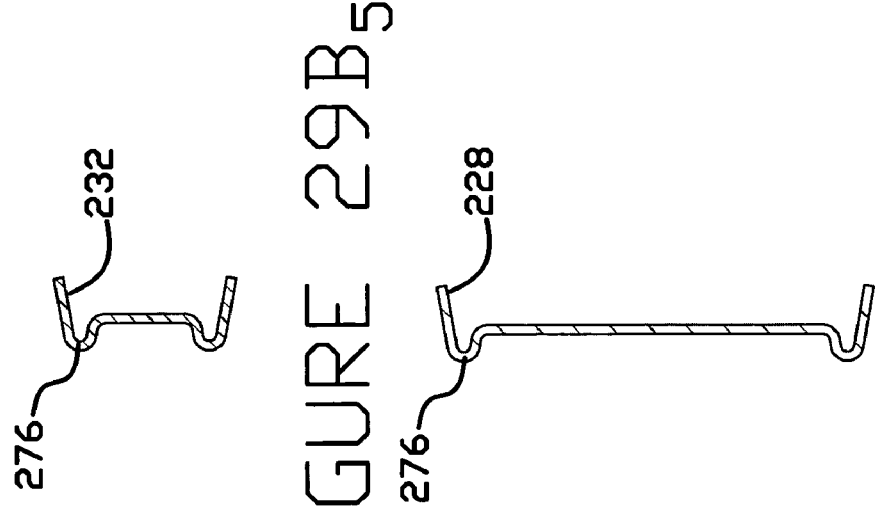
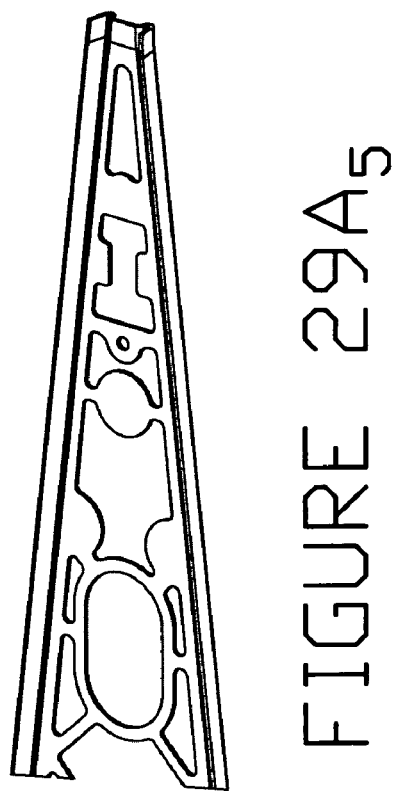
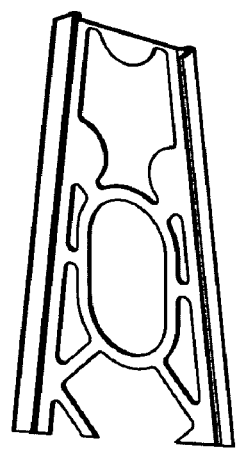
FIGURE 29B5
FIGURE 29B6
FIGURE 29A5
FIGURE 29A6

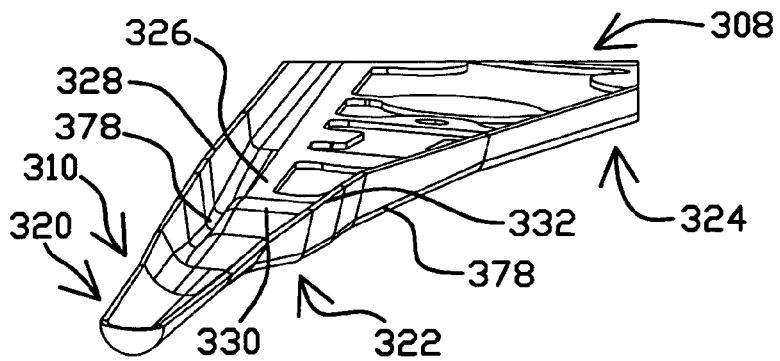
FIGURE 33
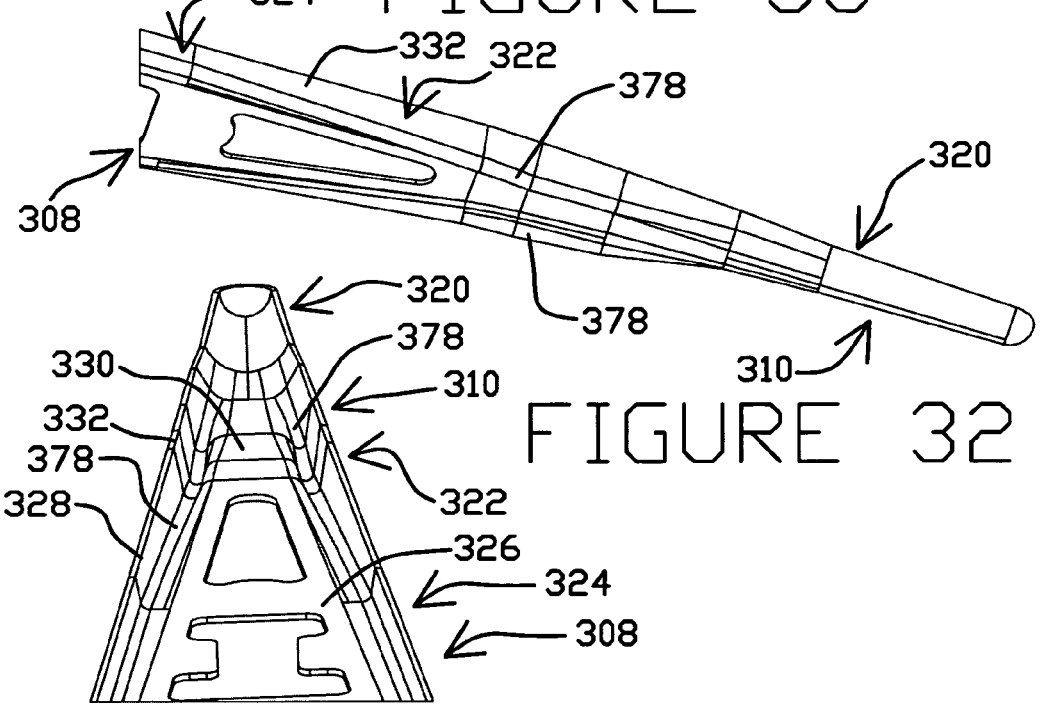
FIGURE 32
FIGURE 30
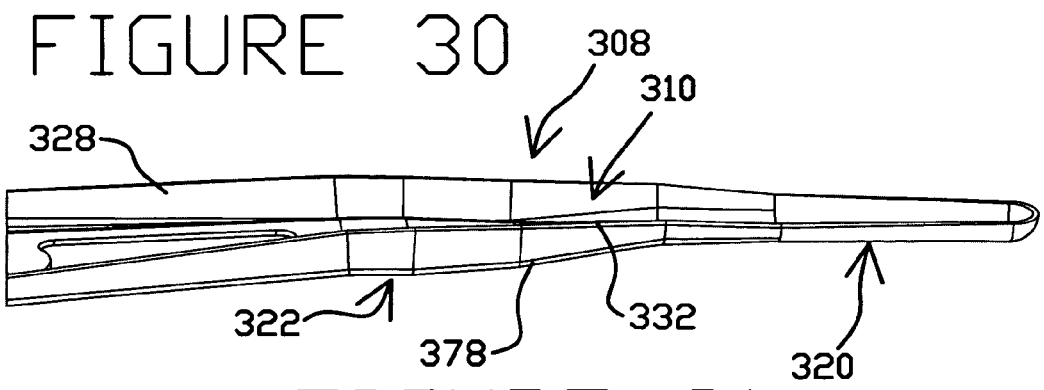
FIGURE 31

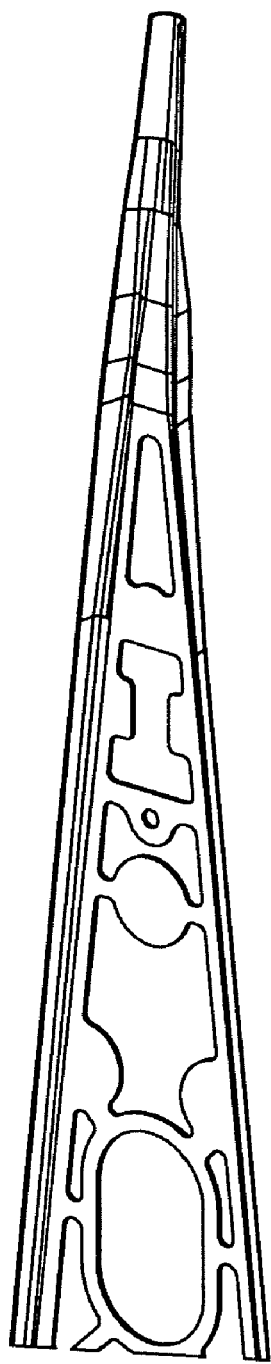
FIGURE 34A₁
FIGURE 34B₁

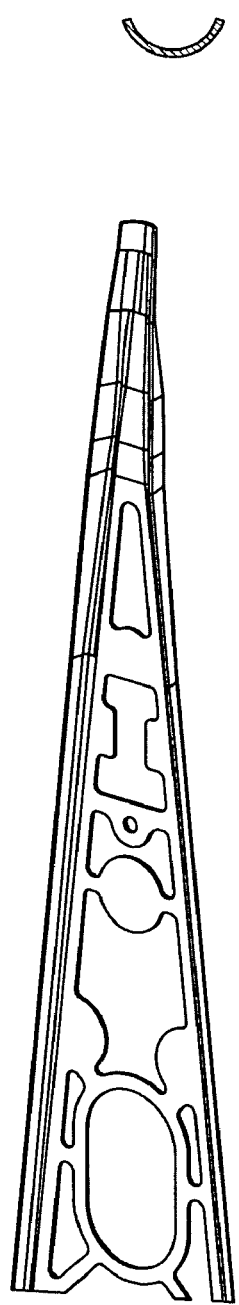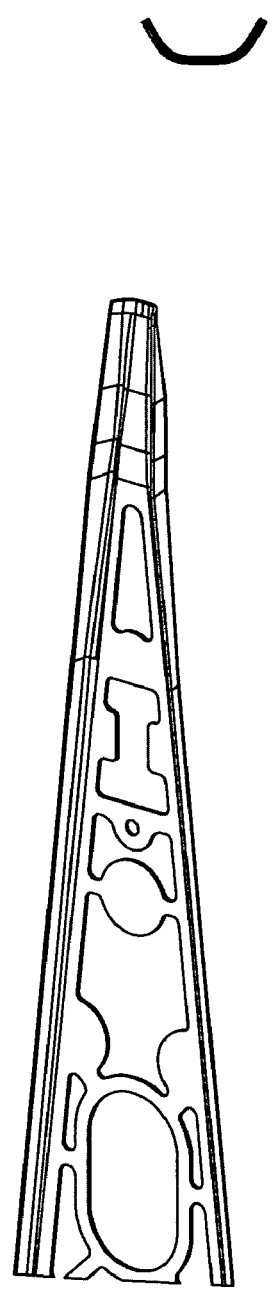
FIGURE 34A₂  FIGURE 34B₂  FIGURE 34A₃  FIGURE 34B₃

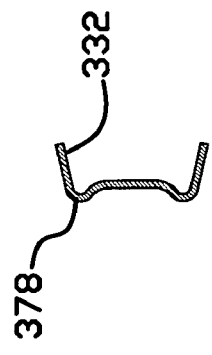
FIGURE 34B₄
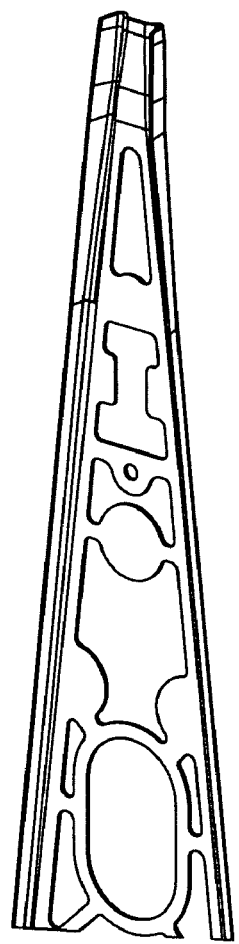
FIGURE 34A₄
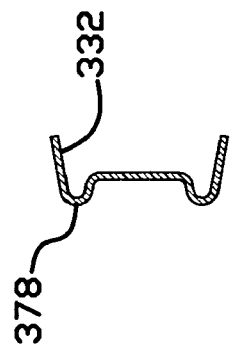
FIGURE 34B₅
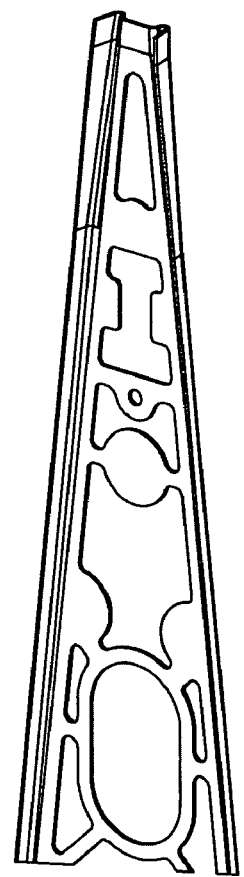
FIGURE 34A₅

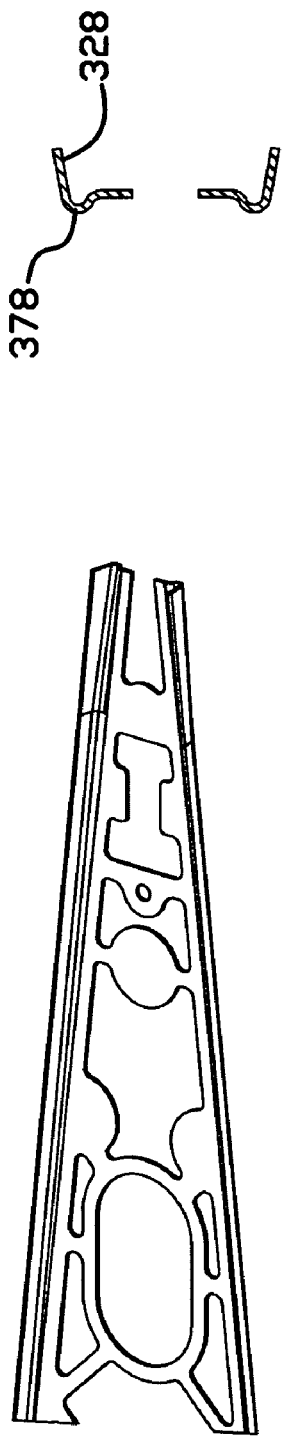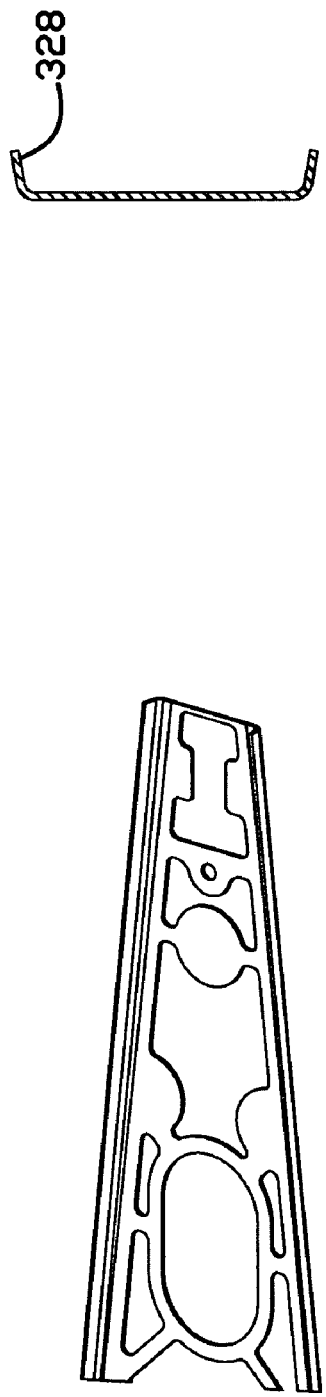
FIGURE 34B₆
FIGURE 34B₇
FIGURE 34A₆
FIGURE 34A₇

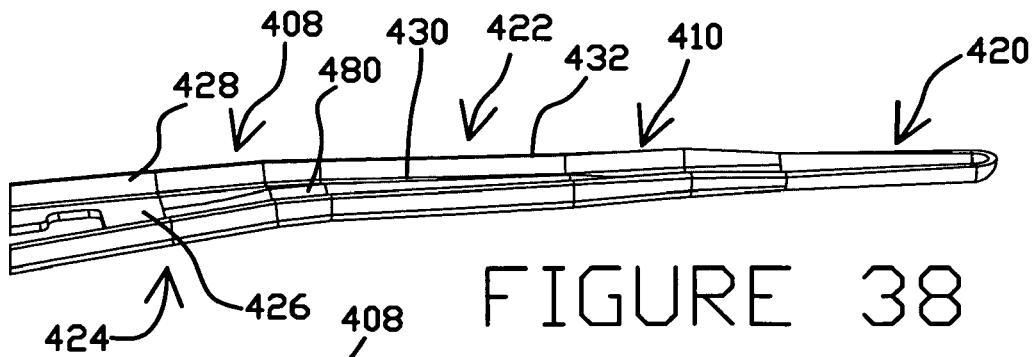
FIGURE 38
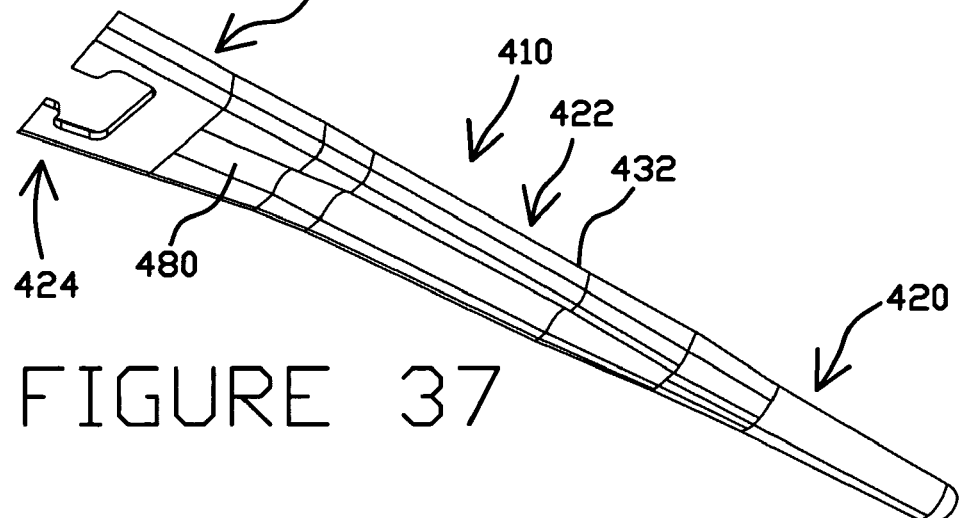
FIGURE 37
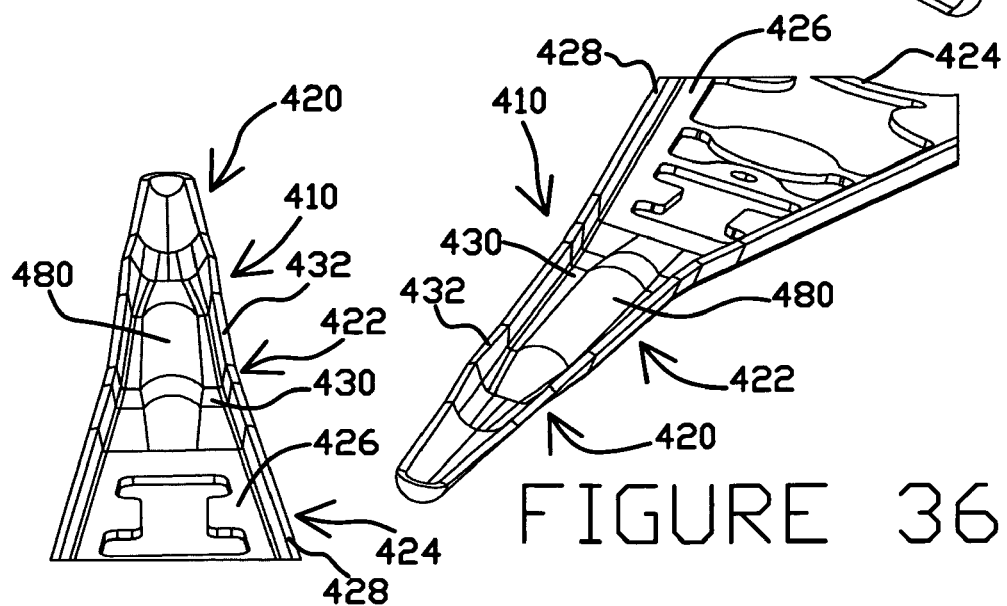
FIGURE 36
FIGURE 35

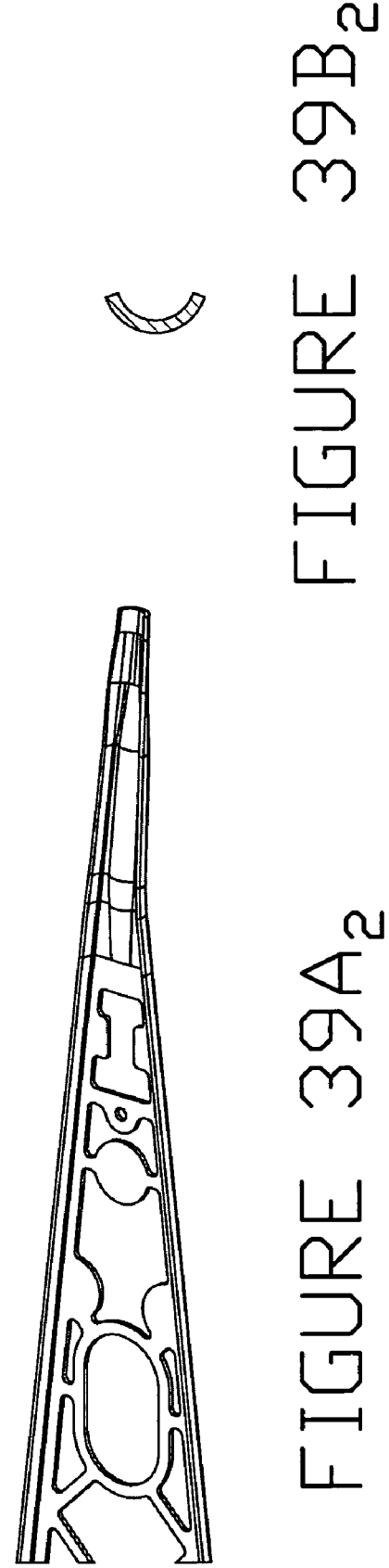
FIGURE 39A₁  FIGURE 39B₁
FIGURE 39A₂  FIGURE 39B₂

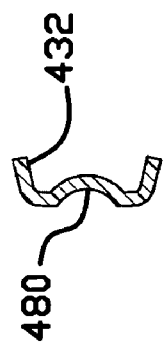
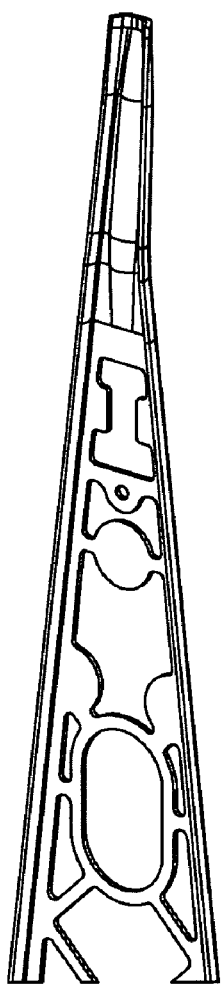
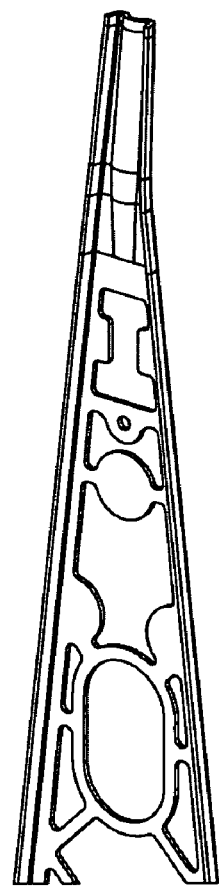
FIGURE 39B₃
FIGURE 39B₄
FIGURE 39A₃
FIGURE 39A₄

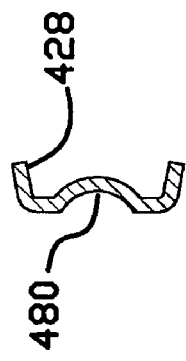
FIGURE 39B₅
FIGURE 39B₆
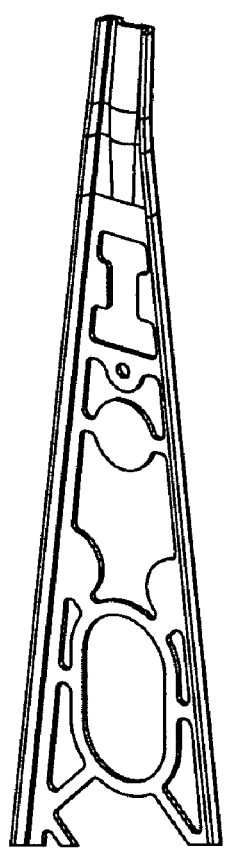
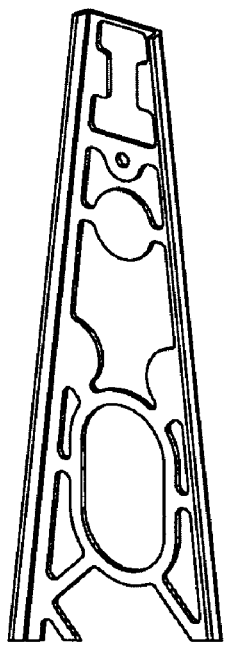
FIGURE 39A₅
FIGURE 39A₆

US 7,724,476 B1

COINED HEADLIFT WITH FORMED RAIL OFFSET FOR A DISK DRIVE HEAD SUSPENSION COMPONENT

REFERENCE TO RELATED APPLICATIONS

This application claims the benefit of the following U.S. Provisional Applications, all of which are entitled Headlift With Formed Rail Offset and hereby incorporated by reference in their entirety:
1. Ser. No. 60/610,426, filed Sep. 16, 2004.
2. Ser. No. 60/633,873, filed Dec. 6, 2004.
3. Ser. No. 60/656,768, filed Feb. 25, 2005.
4. Ser. No. 60/678,280, filed May 6, 2005.

FIELD OF THE INVENTION

The invention is a disk drive headlift structure and method of manufacture.

BACKGROUND OF THE INVENTION

Load beams, headlifts and other components of disk drive head suspensions are well known and commercially available. Methods for manufacturing these components are also well known. By way of example, components and manufacturing methods of these types are shown in the Aoyagi et al. U.S. Pat. No. 6,181,529, Watanabe U.S. Pat. No. 6,483,670, Hayen et al. U.S. Pat. No. 6,617,542, Lee et al. U.S. Patent Application Publication No. 2005/0030671, Japanese Patent No. 2005011511 and Japanese Patent Publication No. 01-107384. There remains, however, a continuing need for improved headlifts and related manufacturing methods. In particular, there is a need for relatively stiff headlifts and efficient manufacturing processes.

SUMMARY OF THE INVENTION

One embodiment of the invention is a relatively stiff disk drive head suspension headlift component formed from a single piece of metal including a beam region, headlift tab and offset region between the beam region and headlift tab. The beam region has a major surface and side rails. The headlift tab is trough-shaped and located at a z-height spaced from the major surface of the beam region. The offset region has a major surface and side rails that transition in height between the side rails of the beam region and the headlift tab. Other embodiments of the invention include crimps in the side rails at one or both of the intersection of the beam region side rails and the offset region side rails and the intersection of the offset region side rails and the headlift tab.

Another embodiment of the invention is an efficient method for manufacturing a disk drive head suspension headlift component from a single piece of metal. The method includes coining a trough-shaped headlift tab, forming rails on a beam region and forming a z-height offset region having a major surface and transitional height side rails between the beam region rails and the headlift tab. The headlift tab can be coined and the offset region surface formed before the rails are formed on the beam region and offset region.

BRIEF DESCRIPTION OF THE DRAWINGS

FIG. 5 is a side view of the headlift of the load beam shown in FIG. 1.

FIG. 6 is an isometric view showing the top and one side of the headlift of the load beam shown in FIG. 1.

FIG. 7 is an isometric view showing the bottom and one side of the headlift of the load beam shown in FIG. 1.

Figure 1:
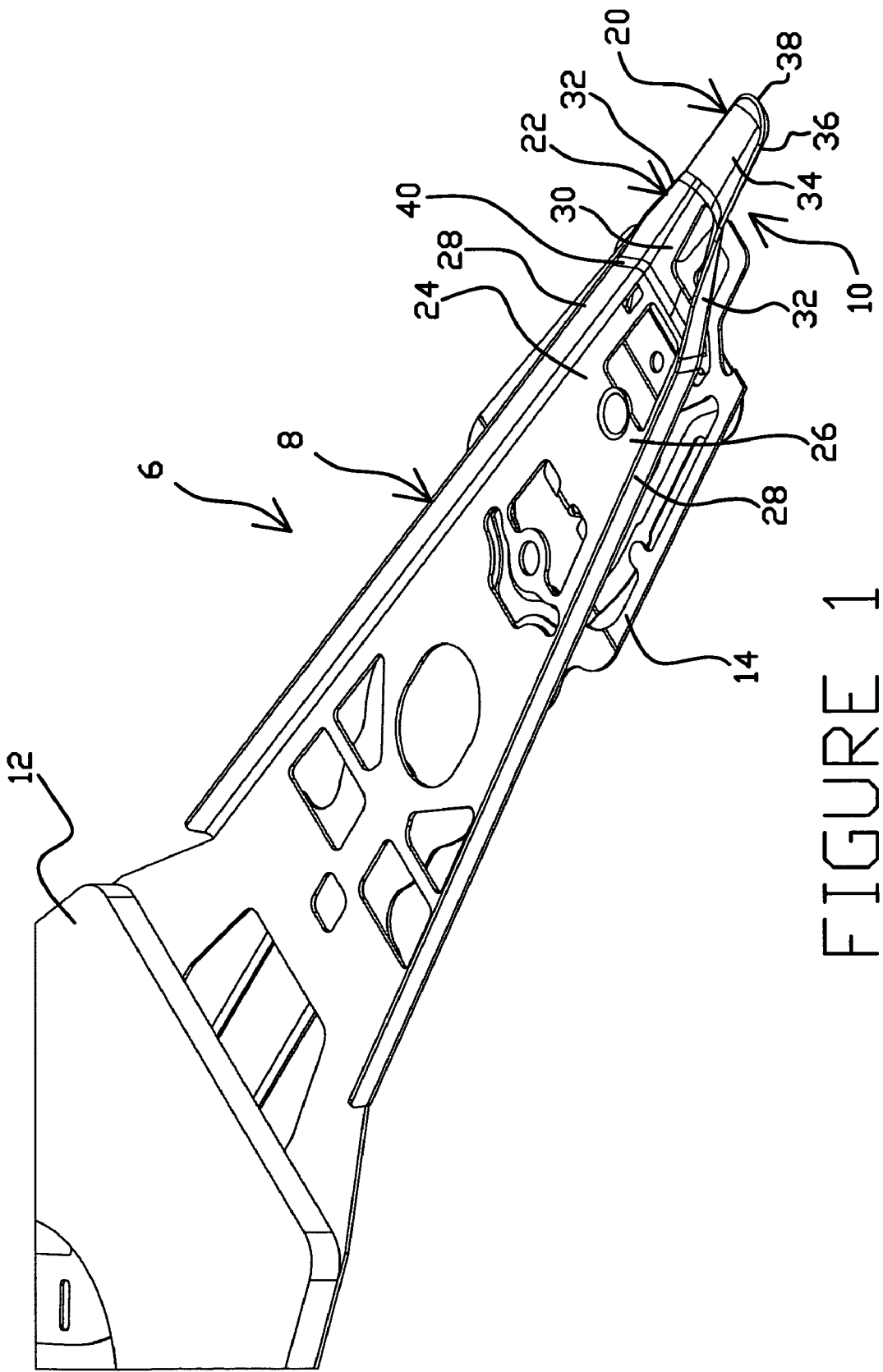
FIG. 1 is an illustration of a disk drive head suspension including a load beam having a headlift in accordance with one embodiment of the invention, and a flexure and base plate mounted to the load beam.
Figure 2:
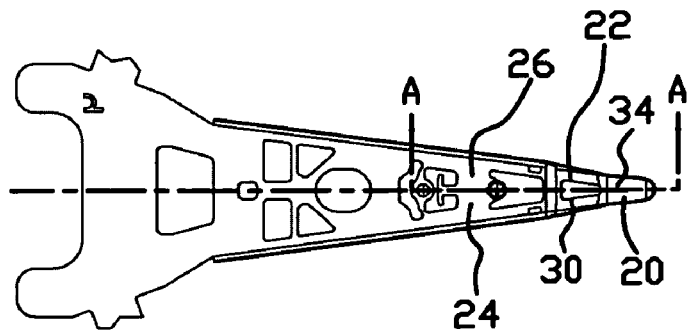
FIG. 2 is a top plan view of the load beam shown in FIG. 1.
Figure 3:
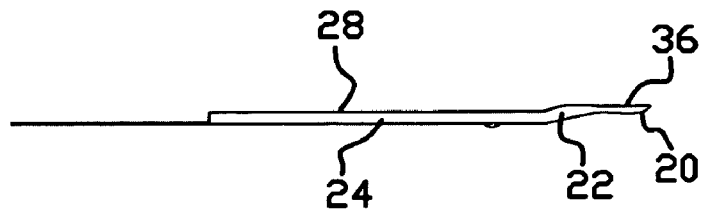
FIG. 3 is a side view of a portion of the load beam shown in FIG. 2.
Figure 4:
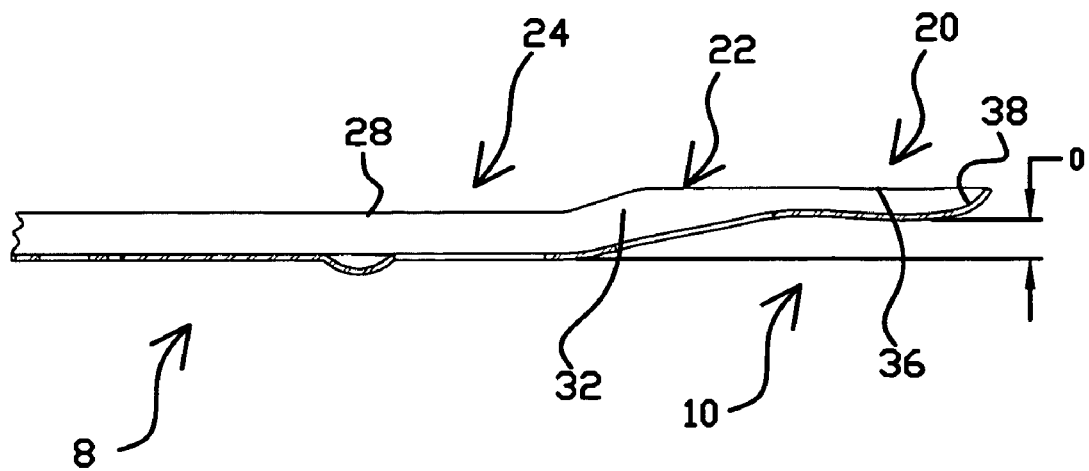
FIG. 4 is a sectional view of the portion of the load beam shown in FIG. 2, taken along line A-A in FIG. 2

FIGS. $8A_1$ and $8B_1$-$8A_5$ and $8B_5$ are corresponding illustrations of a portion of the load beam shown in FIG. 1 with the headlift cut off at different locations along its longitudinal axis, and the cross sectional shape of the headlift at the cut off locations.

FIG. 9 is an illustration of a flat load beam component from which the load beam and headlift shown in FIG. 1 can be manufactured.

Figure 10:
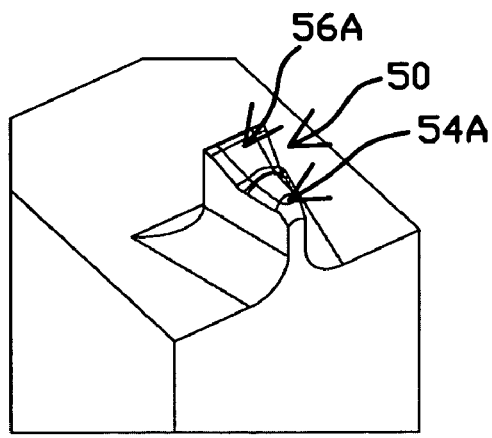

FIG. 10 is an illustration of a punch that can be used in accordance with one embodiment of the invention to manufacture portions of the headlift shown in FIG. 1 from the flat load beam component shown in FIG. 9.

Figure 11:
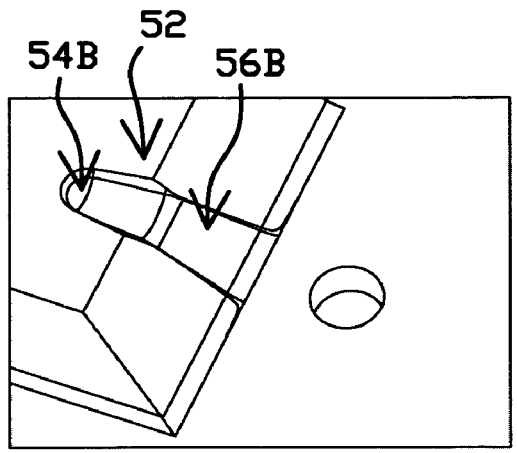

FIG. 11 is an illustration of a socket that can be used in cooperation with the punch shown in FIG. 10 to manufacture the headlift.

Figure 12:
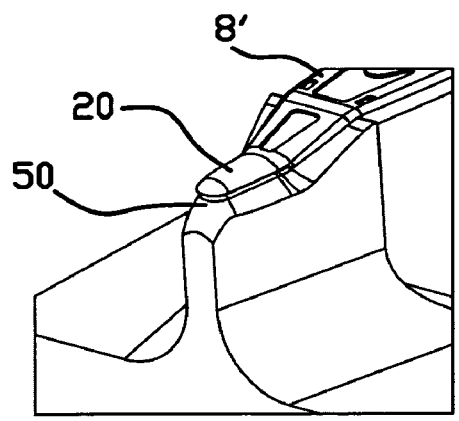

FIG. 12 is an illustration of the punch shown in FIG. 10 and the flat load beam component shown in FIG. 9 during the manufacture of the headlift.

Figure 13:
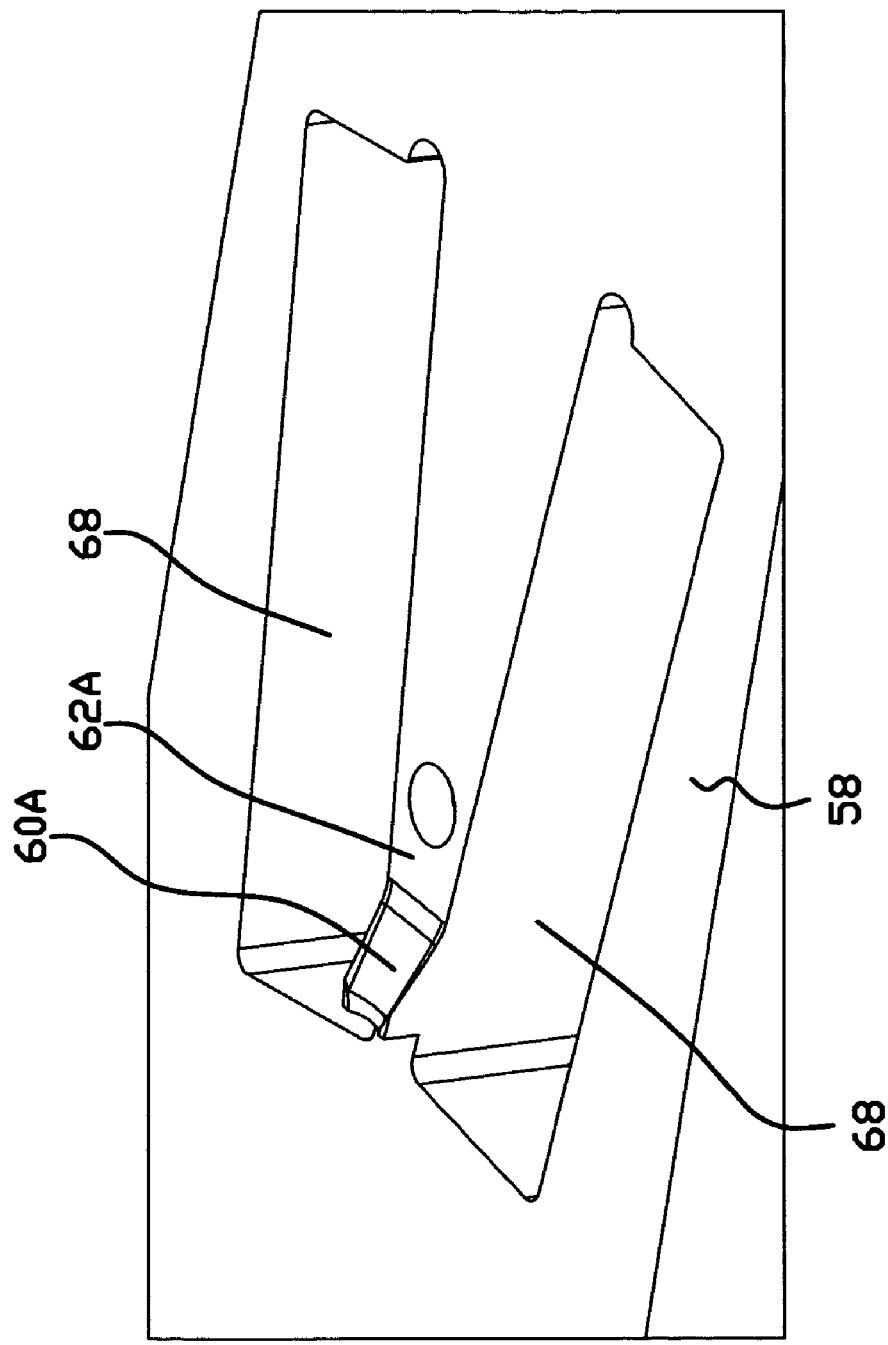

FIG. 13 is an illustration of a rail form bottom clamp that can be used in accordance with one embodiment of the invention to manufacture portions of the headlift shown in FIG. 1 from the flat load beam component shown in FIG. 9.

Figure 14:
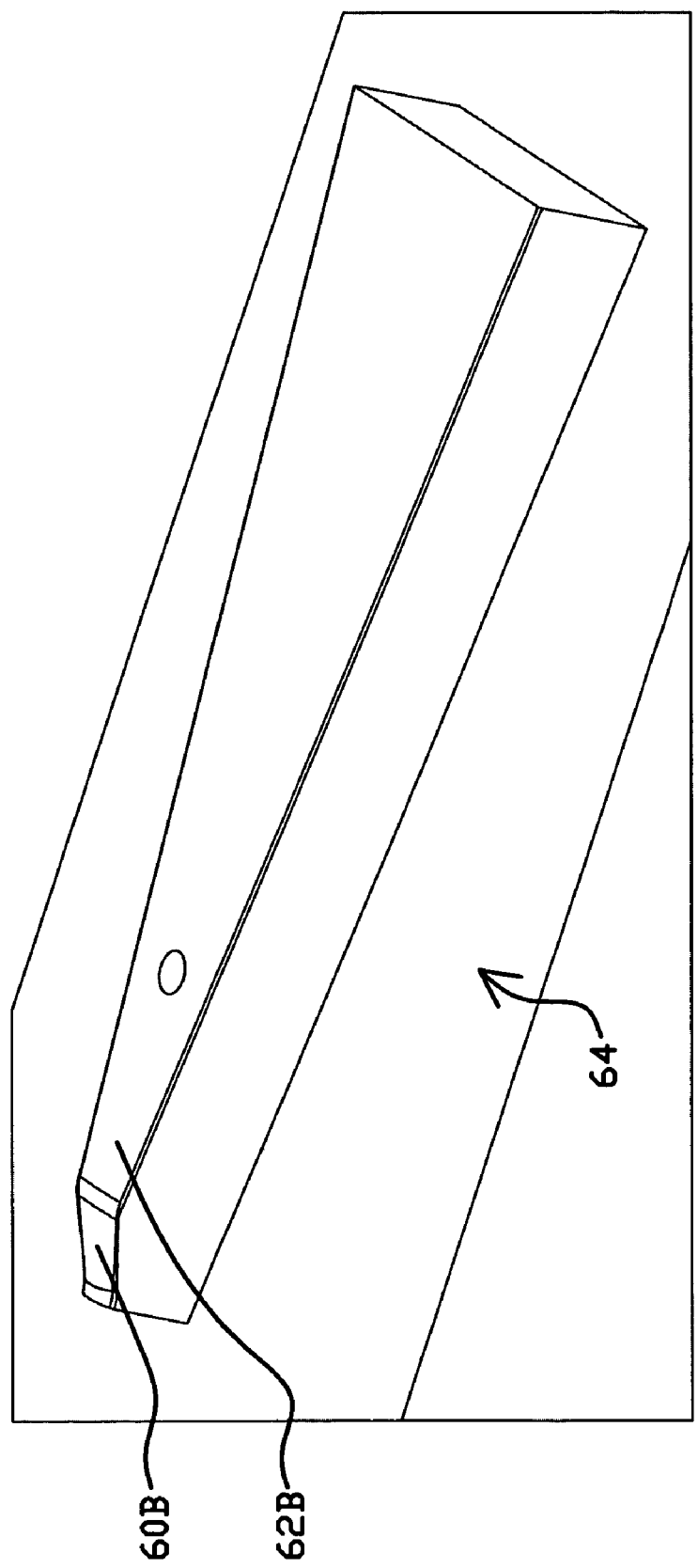

FIG. 14 is an illustration of a rail form top clamp that can be used in cooperation with the bottom clamp shown in FIG. 13 during the manufacture of the headlift.

Figure 15:
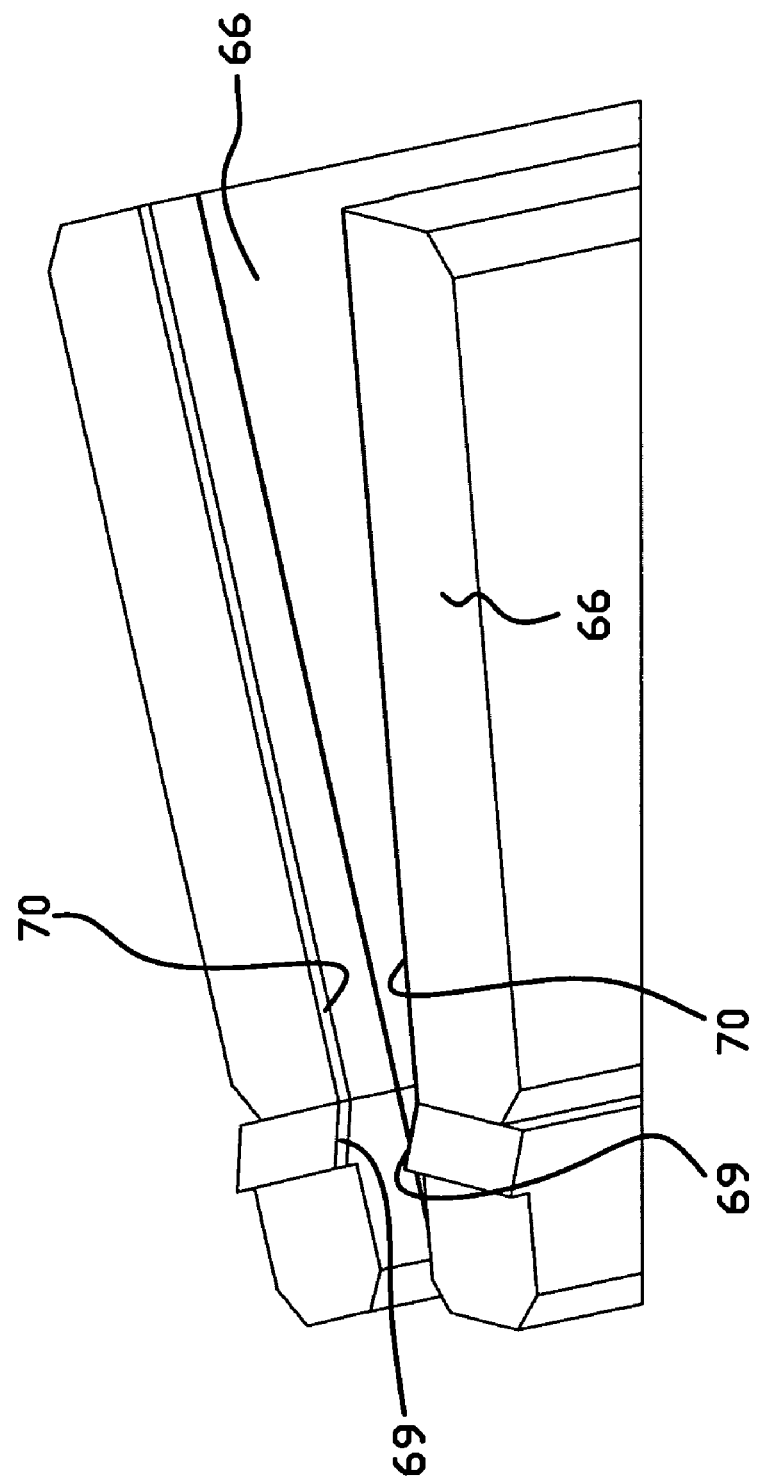

FIG. 15 is an illustration of rail form punches that can be used in cooperation with the rail form bottom clamp and the rail form top clamp shown in FIGS. 13 and 14, respectively, during the manufacture of the headlift.

Figure 16:
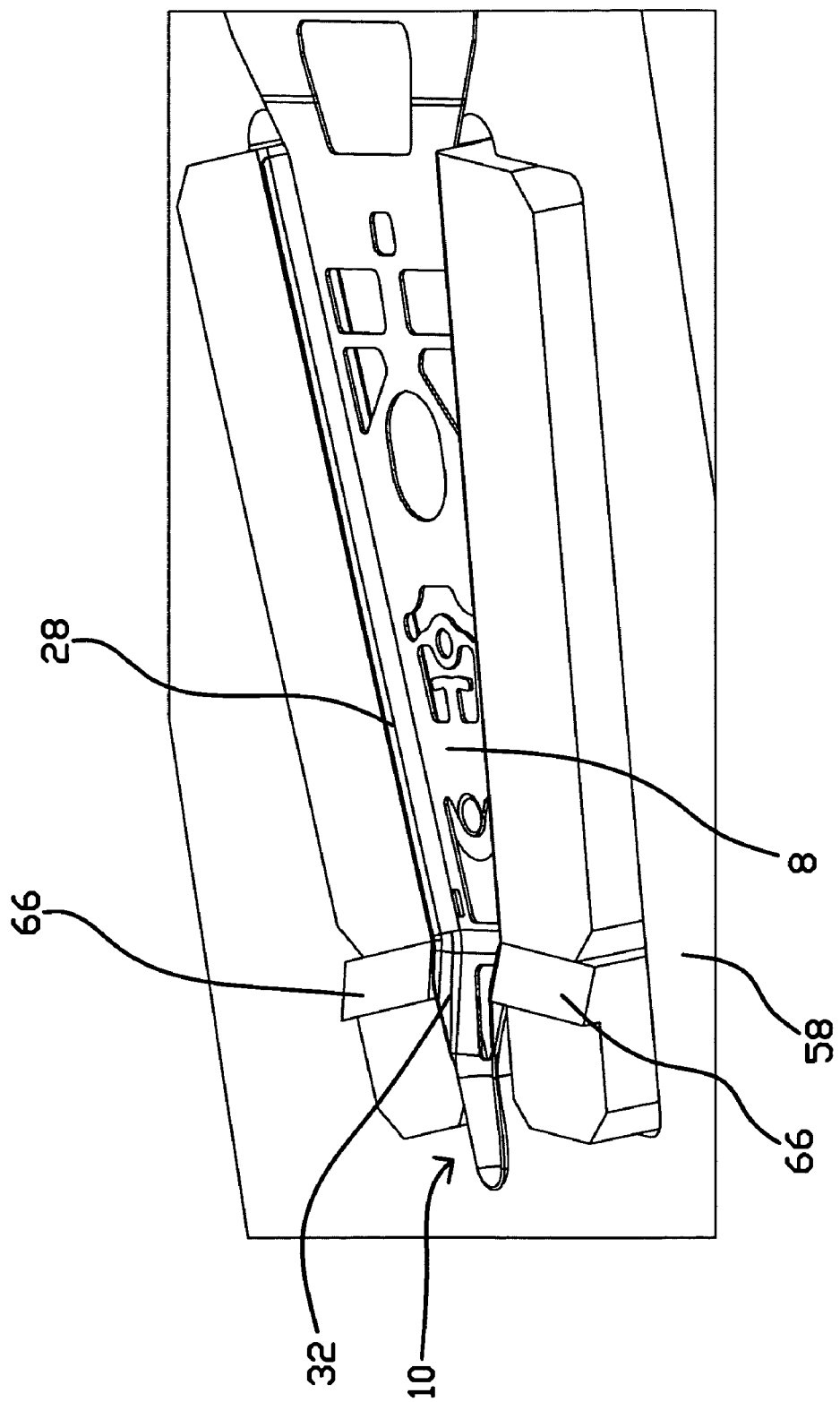

FIG. 16 is an illustration of the rail form bottom clamp of FIG. 13 and the rail form punches of FIG. 15 in an extended position, with a load beam having a headlift in accordance with the present in the bottom clamp.

Figure 17:
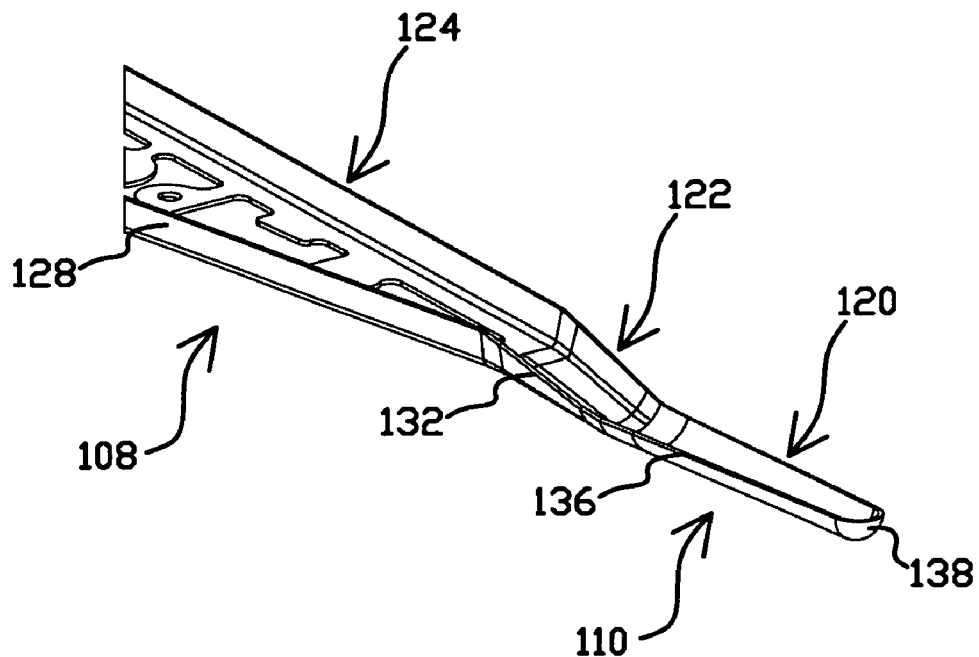

FIG. 17 is an isometric view of a portion of a load beam having a reverse offset headlift in accordance with another embodiment of the invention.

Figure 18:
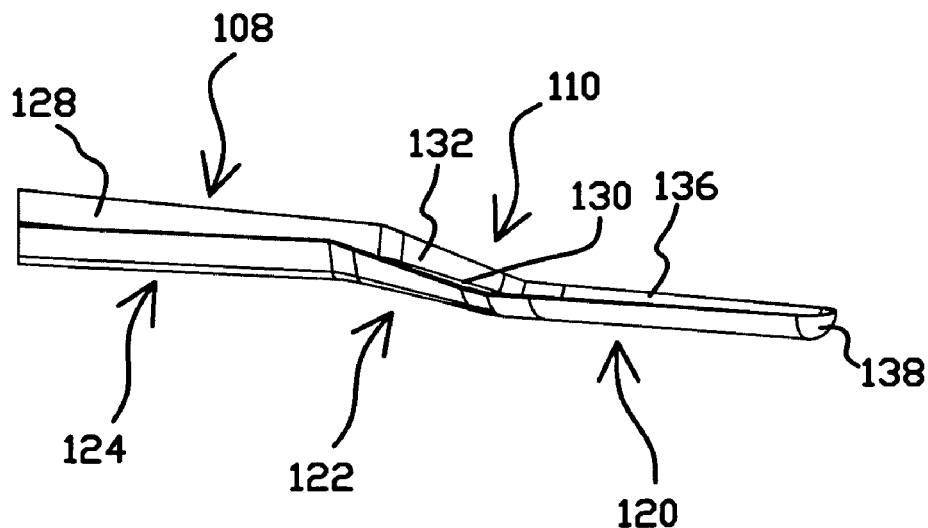

FIG. 18 is an isometric view of a portion of a load beam and reverse offset headlift shown in FIG. 17.

FIG. 19 is a side view of the load beam and headlift shown in FIG. 17.

FIG. 20 is a top plan view of the load beam and headlift shown in FIG. 17.

FIGS. $21A_1$ and $21B_1$-$21A_4$ and $21B_4$ are corresponding illustrations of a portion of the load beam shown in FIG. 17 with the headlift cut off at different locations along its longitudinal axis, and the cross sectional shape of the headlift at the cut off locations.

FIG. 22 is an isometric view of a portion of a load beam having a reverse offset headlift with a tapered tip in accordance with another embodiment of the invention.

FIG. 23 is a side view of a portion of the load beam and headlift shown in FIG. 22.

Figure 24A:
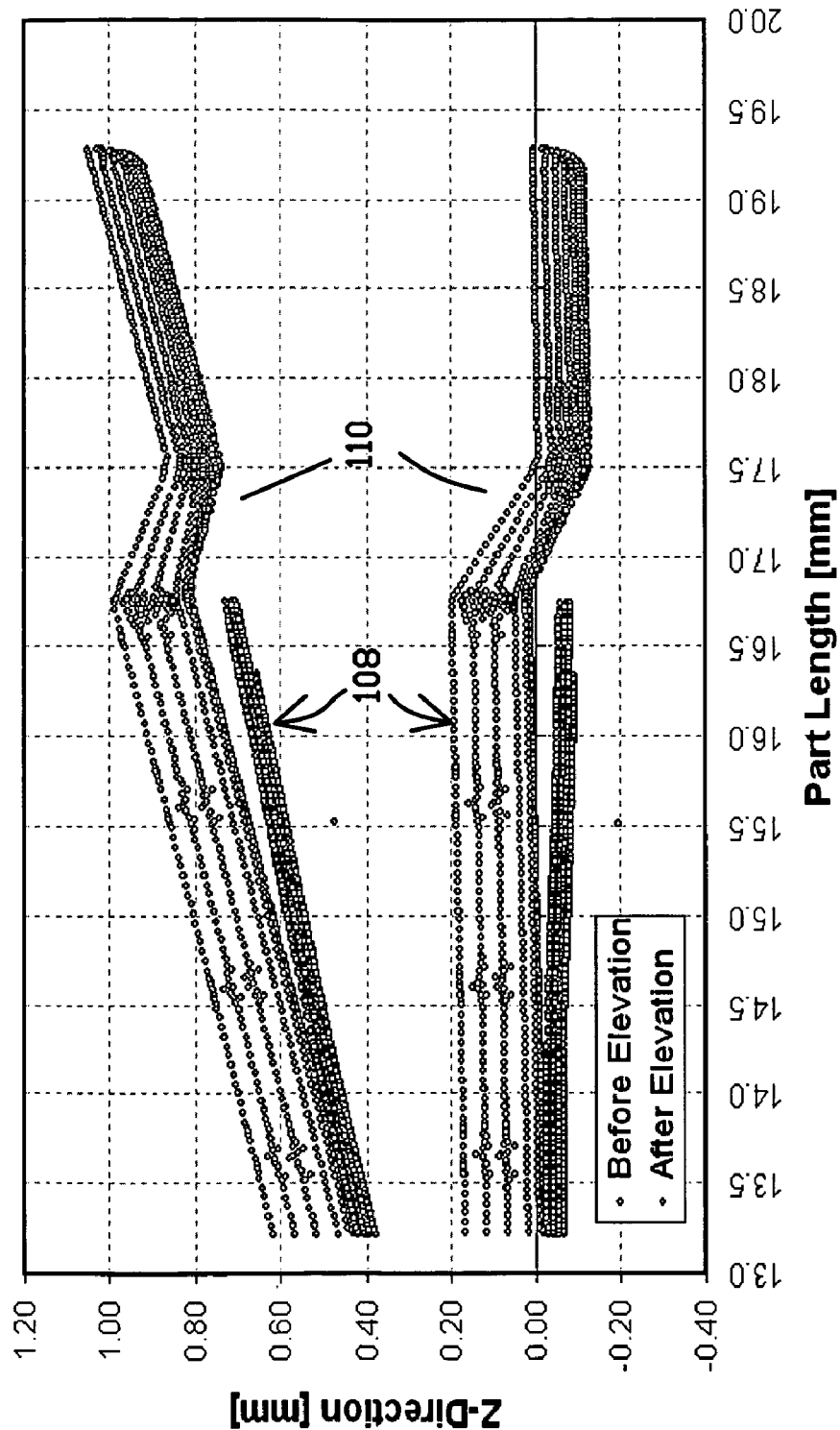
Figure 24B:
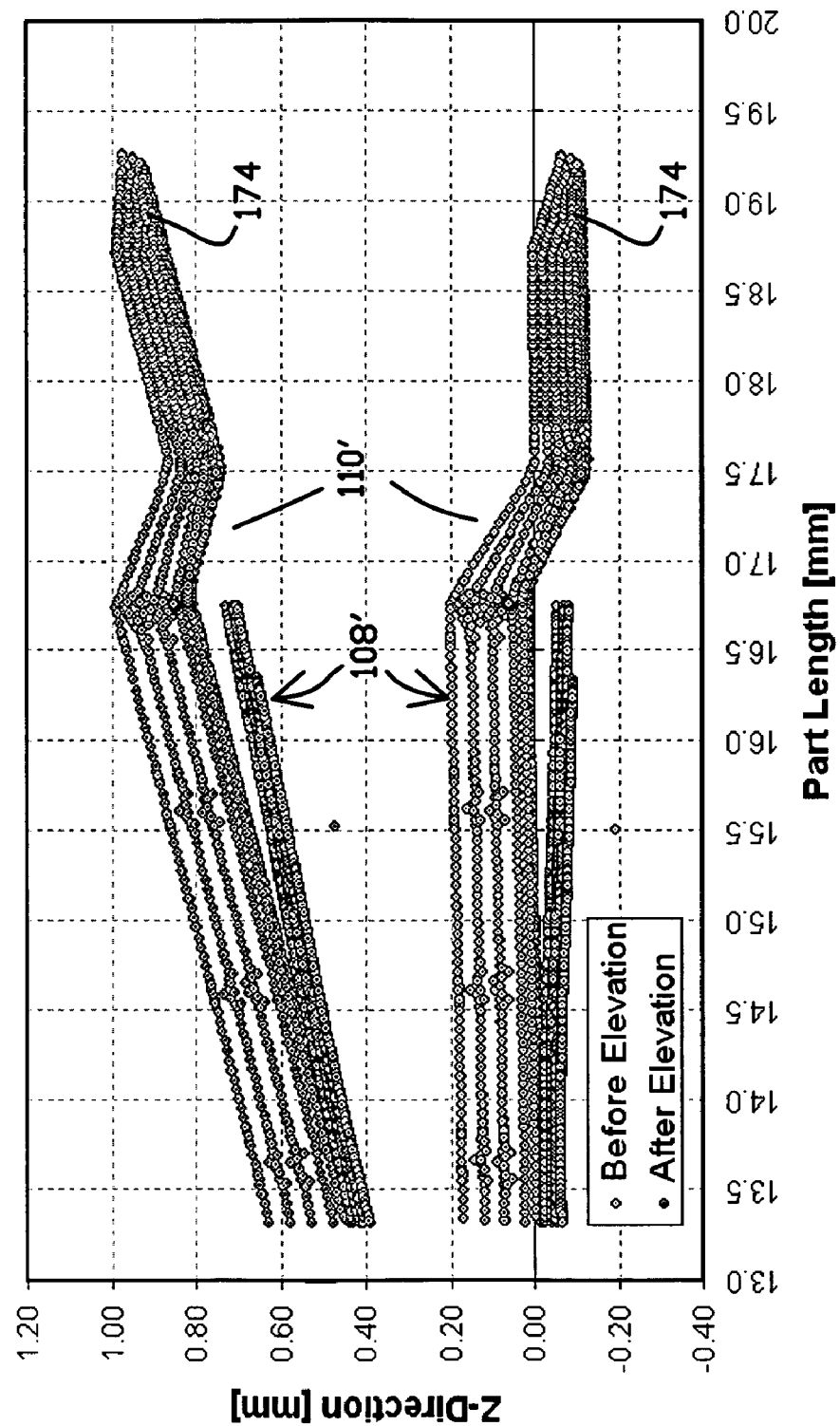

FIGS. 24A and 24B are graphs showing the load beams and headlifts of FIGS. 17 and 22, respectively, at unelevated and elevated positions.

FIG. 25 is an isometric view showing the top of a portion of a load beam and headlift having a full gutter rail in accordance with another embodiment of the invention.

FIG. 26 is an isometric view showing the top and one side of a portion of the load beam and headlift shown in FIG. 25.

FIG. 27 is an isometric view showing the bottom and one side of a portion of the load beam and headlift shown in FIG. 25.

FIG. 28 is an isometric view showing the top and one side of a portion of the load beam and headlift shown in FIG. 25.

FIGS. $29A_1$ and $29B_1$-$29A_6$ and $29B_6$ are corresponding illustrations of a portion of the load beam shown in FIG. 25 with the headlift cut off at different locations along its longitudinal axis, and the cross sectional shape of the headlift at the cut off locations.

FIG. 30 is an isometric view showing the top of a portion of a load beam and headlift having a tapered gutter rail in accordance with another embodiment of the invention.

FIG. 31 is an isometric view showing the top and one side of a portion of the load beam and headlift shown in FIG. 30.

FIG. 32 is an isometric view showing the bottom and one side of a portion of the load beam and headlift shown in FIG. 30.

FIG. 33 is an isometric view showing the top and one side of a portion of the load beam and headlift shown in FIG. 30.

FIGS. $34A_1$ and $34B_1$-$34A_7$ and $34B_7$ are corresponding illustrations of a portion of the load beam shown in FIG. 30 with the headlift cut off at different locations along its longitudinal axis, and the cross sectional shape of the headlift at the cut off locations.

FIG. 35 is an isometric view showing the top of a portion of a load beam and headlift having a center gutter in accordance with another embodiment of the invention.

FIG. 36 is an isometric view showing the top and one side of a portion of the load beam and headlift shown in FIG. 35.

FIG. 37 is an isometric view showing the bottom and one side of a portion of the load beam and headlift shown in FIG. 35.

FIG. 38 is an isometric view showing the top and one side of a portion of the load beam and headlift shown in FIG. 35.

FIGS. $39A_1$ and $39B_1$-$39A_6$ and $39B_6$ are corresponding illustrations of a portion of the load beam shown in FIG. 35 with the headlift cut off at different locations along its longitudinal axis, and the cross sectional shape of the headlift at the cut off locations.

DETAILED DESCRIPTION OF THE PREFERRED EMBODIMENTS

FIG. 1 is an illustration of a portion of disk drive head suspension 6 having a load beam 8 with a headlift 10 in accordance with one embodiment of the present invention at its distal end. A base plate 12 and flexure 14 are shown mounted to the load beam 8 in FIG. 1. FIGS. 2-7 and $8A_1$ and $8B_1$-$8A_5$ and $8B_5$ shown the headlift 10 in greater detail. With the exception of headlift 10, the structures and associated manufacturing methods of the other portions of suspension 6, including portions of load beam 8, the base plate 12 and the flexure 14, can be of conventional or otherwise known technologies.

As shown, headlift 10 includes a tab 20 and offset region 22 that extend distally from a region 24 on load beam 8. The load beam region 24 has a major surface 26 and side rails 28 on its opposite sides. Offset region 22 has a major surface 30 and rails 32 on it opposite sides. Tab 20 has a bottom or major surface 34, a pair of opposite side edges 36 and a distal edge 38. Offset region 22 is oriented at an angle with respect to the major surface 26 of the load beam region 24 to offset the tab 20 with respect to the load beam region in what is known as the z-height direction. This z-height offset is shown by dimension O in FIG. 4. In the illustrated embodiment the tab 20 is offset in the direction that the rails 28 of the load beam 8 extend. The tab 20 and load beam region 24 are generally parallel in the illustrated embodiment, but are non-parallel in other embodiments (not shown).

Tab 20 is a generally trough-shaped member in the embodiment shown, and has side edges 36 and a distal edge 38 that are offset in the z-height from the bottom of surface 34. As perhaps best shown in FIGS. $8A_1$, $8B_1$, $8A_2$ and $8B_2$, the major surface 34 of the tab 20 is generally arcuate in cross section. Other embodiments of tab 20 (not shown) have other shapes.

Surface 30 of the offset region 22 has an arcuate cross section in the embodiment shown in FIGS. 1-6. As perhaps best shown in FIGS. $8B_3$-$8B_5$, the cross sectional shape of the surface 30 continuously transitions from the cross sectional shape at the intersection with tab 20 to the cross sectional shape at the intersection with beam region 24. Other embodiments of the invention (not shown) have an offset region surface 30 with different cross sectional shapes and/or discontinuous shape transitions.

The side rails 32 of the offset region 22 taper or transition in height between the load beam region 24 and the tab 20. In the illustrated embodiment, the height transition of the offset region rails 32 is continuous between the height at the intersection with the rails 28 on the load beam region 24 and an essentially zero height at the intersection with the side edges 36 of the tab 20. Other embodiments (not shown) have other transition profiles. Creases or crimps 40 in the offset region side rails 32 (i.e., relatively small regions that are bowed or otherwise out of the plane of other portions of the rails) facilitate the manufacture of headlift 10 as described in greater detail below. The illustrated embodiment of headlift 10 includes a pair of crimps 40 in each offset region side rail 32, one near the intersection with the load beam region 24 and the other near the intersection with the tab 20. Other embodiments (not shown) can include more or fewer crimps, and/or crimps at different locations, for purposes similar to those of crimps 40.

FIG. 9 is an illustration of flat load beam component 8' from which a load beam such as 8 having headlift 10 can be manufactured. Load beam component 8' can itself be manufactured by conventional or otherwise known processes from known materials. By way of example, photolithography and chemical etching processes are commonly used to manufacture flat load beam components such as 8' from relatively thin stainless steel. One embodiment of the invention is a multi-operation process for manufacturing the headlift 10 on the distal end of the flat load beam component 8'. In this embodiment of the invention the tab 20 is manufactured by coining the region 20' on the flat component 8'. The offset region 22 is manufactured in part by a forming or mechanical bending process on the region 22' of the flat component 8' substantially concurrently with the coining of the tab region 20'. Subsequent to the forming process on the offset region 22' of the flat component 8', the edges of the offset region 22' of the flat component are formed into side rails 32. The side rails 28 of the beam region 24 are formed from the edges of the beam region 24' of the flat component 8'.

FIGS. 10 and 11 illustrate complimentary-shaped punch 50 and socket 52, respectively, that can be used to manufacture the headlift 10. As shown, regions 54A and 54B of the punch 50 and socket 52, respectively, have shapes that correspond to the shape of tab 20, and that will produce the desired shaping and coining of the tab when the punch and socket are engaged with opposite sides of the region 20' of the flat load beam component 8' during the manufacturing operation. As noted above, the tab 20 is coined in one embodiment of the invention. This coining process is achieved by timing the interference between the punch region 54A, the region 20' of the flat component 8' and the socket region 54B, typically between 20% and 30% of the thickness of the region 20'.

Regions 56A and 56B of the punch 50 and socket 52, respectively, have shapes that correspond to the shape of the surface 30 of the offset region 22, and that will produce the desired shape of the surface 30 from the region 22' of the flat load beam component 8' during the manufacturing operation. The surface 30 of the headlift 10 in one embodiment of the invention is formed (i.e., not coined). The surface 30 can be formed from the region 22' of the flat component 8' at substantially the same time that the tab 20 is coined (i.e., during the same engagement of the punch 50 and socket 52 with the flat component). In this embodiment of the invention, the offset region side rails 32 are not formed during the formation of the offset region surface 30. FIG. 12 is an illustration of the punch 50 with the flat component 8' thereon after the tab 20 has been coined and surface 30 of offset region 22 formed in accordance with the embodiment of the invention described above.

The rails 32 on the offset region 22 are formed after the manufacturing operation described above in one embodiment of the invention. FIG. 13 is an illustration of a rail form bottom clamp 58 that can be used to form the offset region rails 32 and beam region rails 28. As shown, the bottom clamp 58 has a region 60A that is shaped to receive the offset region surface 30 formed into the flat component 8' during the manufacturing operation described above, and a region 62A for receiving a beam portion 24' of the flat component. FIG. 14 is an illustration of a rail form top clamp 64 that can be used in cooperation with the bottom clamp 58 shown in FIG. 13. As shown, the top clamp 64 has a region 60B that is shaped to mate with the offset region surface 30 in the flat component 8', and a region 62B for mating with the beam portion 24' of the flat component. FIG. 15 is an illustration of rail form punches 66 that can be driven in the slots 68 of the rail form bottom clamp 58 shown in FIG. 13 during the manufacture of the headlift 20. Punches 66 have an offset region edge portion 69 and a beam region edge portion 70.

Offset region side rails 32 and beam region side rails 28 are substantially simultaneously formed on the flat component 8' during one embodiment of the invention. In this embodiment the flat component 8' is formed with offset region surface 30 and flat beam region 24' clamped between the bottom clamp 58 and top clamp 64, between regions 60A and 60B, and regions 62A and 62B, respectively. When the partially manufactured flat component 8' is in this clamped position (not shown), the edges of the offset region 22' and the beam region 24' will extend into the slots 68 in the bottom clamp 58. The punches 66 are then forced through the slots 68 of the bottom clamp 58, with the offset region edge portions 69 of the punches engaging the extending edges of the offset region 22' and the beam region edge portions 70 engaging the extending edges of the beam region 24' (not shown). Further motion of the punches 66 causes the edge portions 69 and 70 to bend and form the offset region rails 32 and beam region rails 28. This manufacturing operation has been found to produce the crimps 40 of the type described above. FIG. 16 is an illustration of the load beam 8 and headlift 10 located in the bottom clamp 58 with the punches 66 in the extended position following the manufacturing operation described above. Rails 32 and 28 are formed at substantially the same time during the embodiment of the manufacturing method described above. Other embodiments of the invention (not shown) use split or separate punches to form the offset region rails 32 and beam region rails 28 during separate manufacturing operations.

FIGS. 17-20 and $21A_1$ and $21B_1$-$21A_5$ and $21B_5$ are illustrations of a portion of a load beam 108 having a reverse formed rail offset headlift 110 in accordance with another embodiment of the invention. As shown, the offset region 122 of headlift 110 extends in a z-height direction that is opposite the direction of the offset region 22 of headlift 10 described above (i.e., in a direction opposite the direction that the rails 128 extend). With the exception of the offset region 122 and features related to its intersection with the beam region 124 and tab 120, load beam 108 and headlift 110, and the method by which they are manufactured, can be substantially the same or similar to those of load beam 8 and headlift 10 described above, and similar features are identified by similar reference numbers.

FIGS. 22 and 23 are illustrations of a portion of a load beam 108' having a reverse formed rail offset headlift 110' with a tapered tip 174. As shown the edges 136' and 138' at the tip 174 of tab 120' slope or taper in the same direction as that of the offset region 122'. With the exception of the tapered tip 174, load beam 108' and headlift 110', and the method by which they are manufactured, can be substantially the same or similar to those of load beam 108 and headlift 110 described above, and similar features are identified by similar reference numbers. As is evident from FIGS. 24A and 24B that illustrate the load beams 108 and 108', respectively, at unelevated and elevated positions, load beam 108' and its headlift 110' provide additional clearance in the z-direction.

FIGS. 25-28 and $29A_1$ and $29B_1$-$29A_6$ and $29B_6$ are illustrations of a portion of a load beam 208 and headlift 210 having a full gutter rail in accordance with another embodiment of the invention. As shown, the rails 228 and 232 in both the beam region 224 and offset region 222, respectively have a gutter 276 at their base. The gutter 276 extends below the major surfaces 226 and 230 of the beam region 224 and offset region 222, respectively. As perhaps best shown in FIGS. $29A_3$ and $29B_3$-$29A_5$ and $29B_5$, the gutter 276 gradually and continuously reduces in depth along portions of the offset region 222 to a depth of essentially zero at the intersection of the offset region with the tab 220. The gutter 276 also extends along all or at least a substantial portion of the length of the beam region rails 228. With the exception of the gutter 276, load beam 208 and headlift 210, and the method by which they are manufactured, can be substantially the same or similar to those of load beam 8 and headlift 10 described above, and similar features are identified by similar reference numbers. The full gutter 276 provides additional stiffness to the load beam 208 and headlift 210.

FIGS. 30-33 and $34A_1$ and $34B_1$-$34A_7$ and $34B_7$ are illustrations of a portion of a load beam 308 and headlift 310 having a tapered gutter rail 378 in accordance with another embodiment of the invention. As shown, the rails 328 and 332 in both the beam region 324 and offset region 322, respectively have a gutter 378 at their base. The gutter 378 extends below the major surfaces 326 and 330 of the beam region 324 and offset region 322, respectively. As perhaps best shown in FIGS. $34A_2$ and $34B_2$-$34A_4$ and $34B_4$, the gutter 378 gradually and continuously reduces in depth along portions of the offset region 322 to a depth of essentially zero at the intersection of the offset region with the tab 320. The gutter 378 extends for only a portion of the length of the beam region rails 328 and as perhaps best shown in FIGS. $34A_6$ and $34B_6$-$34A_7$ and $34B_7$, the gutter 378 gradually and continuously reduces in depth along portions of the beam region 324 to a depth of essentially zero where it intersects the surface 326 of the beam region. With the exception of the gutter 378, load beam 308 and headlift 310, and the method by which they are manufactured, can be substantially the same or similar to those of load beam 8 and headlift 10 described above, and similar features are identified by similar reference numbers. The tapered gutter 378 provides additional stiffness to the relatively high-stress transition zone near the tab 320.

FIGS. 35-38 and 39A$_1$ and 39B$_1$-39A$_6$ and 39B$_6$ are illustrations of a portion of a load beam 408 and headlift 410 having a center gutter 480 in accordance with another embodiment of the invention. As shown, the gutter 480 extends above portions of both the major surfaces 426 and 430 of the beam region 424 and offset region 422, respectively (i.e., the gutter extends in the direction of the rails 428 and 432). As perhaps best shown in FIGS. 39A$_3$ and 39B$_3$-39A$_4$ and 39B$_4$, the gutter 480 gradually and continuously reduces in depth along portions of the offset region 422 to a depth of essentially zero at the intersection of the offset region with the tab 420. The gutter 480 extends for only a portion of the length of the beam region 424. As perhaps best shown in FIGS. 39A$_5$ and 39B$_5$-349$_6$ and 39B$_6$, the gutter 480 gradually and continuously reduces in depth along portions of the beam region 424 to a depth of essentially zero where it intersects the surface 426 of the beam region. With the exception of the gutter 480, load beam 408 and headlift 410, and the method by which they are manufactured, can be substantially the same or similar to those of load beam 8 and headlift 10 described above, and similar features are identified by similar reference numbers. The center gutter 276 provides additional stiffness to the tab 420 of headlift 210.

Although the present invention has been described with reference to preferred embodiments, those skilled in the art will recognize that changes can be made in form and detail without departing from the spirit and scope of the invention. By way of example without limiting the generality of the foregoing statement, the headlift of the invention can be formed on other components such as beam regions, or a component configured for mounting to a beam region, rather than on a load beam including beam and spring regions.

What is claimed is:

1. A disk drive head suspension component manufactured from a single piece of thin metal, including:
   a beam region having a major surface and side rails, wherein the side rails have a first height extending from the major surface to a top of the side rails;
   a trough-shaped headlift tab at a z-height spaced from the major surface of the beam region; and
   an offset region between the beam region and the headlift tab, the offset region having a major surface and side rails wherein a height of the offset region side rails extends from the offset region major surface to a top of the offset region side rails, and wherein the height of the offset region side rails transitions from the first height at the intersection with the beam region side rails to a second height that is less than the first height at the intersection with the headlift tab.

2. The suspension component of claim 1 wherein the side rails of the offset region include one or more crimps.

3. The suspension component of claim 2 wherein the one or more crimps are located at one or both of the intersection of the beam region side rails and the offset region side rails and the intersection of the offset region side rails and the headlift tab.

4. The suspension component of claim 1 wherein:
   the headlift tab is a coined headlift tab; and
   the side rails of the beam region and offset region are formed rails.

5. The suspension component of claim 1 wherein:
   the major surface of the beam region has a cross sectional shape at its intersection with the offset region;
   a major surface of the headlift tab has a cross sectional shape at its intersection with the offset region that is different than the cross sectional shape of the beam region major surface; and
   the offset region major surface has a cross sectional shape that continuously transitions between the cross sectional shapes of the beam region and headlift tab.

6. The suspension component of claim 5 wherein:
   the major surface of the beam region has a generally planar cross sectional shape at its intersection with the offset region;
   the major surface of the headlift tab has an arcuate cross sectional shape at its intersection with the offset region; and
   the offset region major surface cross sectional shape continuously transitions between the generally planar cross sectional shape of the beam region and the arcuate cross sectional shape of the headlift tab.

7. The suspension component of claim 1 wherein the offset region includes one or more apertures.

8. The suspension component of claim 1, wherein the second height of the offset region side rails is about zero.

9. The suspension component of claim 1 wherein the headlift tab is at a z-height that is spaced from the beam region in the direction of the beam region rails.

10. The suspension component of claim 1 wherein the headlift tab is at a z-height that is spaced from the beam region in a direction away from the direction of the beam region rails.

11. The suspension component of claim 1 wherein the major surfaces of the beam region and the headlift tab are generally parallel.

12. The suspension component of claim 1 wherein the major surfaces of the beam region and the headlift tab are non-parallel.

13. The suspension component of claim 1 wherein the rails of the beam region and offset portion include gutter rails.

14. The suspension component of claim 1 wherein the rails of the beam region and offset portion include tapered gutter rails.

15. The suspension component of claim 1 wherein at least portions of the beam region and offset region include a gutter between the side rails.

16. The suspension component of claim 1, wherein the offset region side rails are generally planar.

17. The suspension component of claim 16, wherein the offset region side rails are co-planar with the beam region side rails.

18. The suspension component of claim 16, wherein the offset region side rails are angled with respect to the beam region side rails.

* * * * *